(12) United States Patent
Turovsky et al.

(10) Patent No.: US 9,843,533 B2
(45) Date of Patent: Dec. 12, 2017

(54) ELASTIC COMPUTE CLOUD BASED ON UNDERUTILIZED SERVER RESOURCES USING A DISTRIBUTED CONTAINER SYSTEM

(71) Applicant: Jisto Inc., Cambridge, MA (US)

(72) Inventors: Andrey Turovsky, Wynantskill, NY (US); Aleksandr Biberman, Cambridge, MA (US)

(73) Assignee: Trilio Data Inc., Hopkinton, MA (US)

( * ) Notice: Subject to any disclaimer, the term of this patent is extended or adjusted under 35 U.S.C. 154(b) by 320 days.

(21) Appl. No.: 14/640,569

(22) Filed: Mar. 6, 2015

(65) Prior Publication Data

US 2015/0256481 A1 Sep. 10, 2015

Related U.S. Application Data

(60) Provisional application No. 62/045,165, filed on Sep. 3, 2014, provisional application No. 61/948,735, filed on Mar. 6, 2014.

(51) Int. Cl.
| | |
|---|---|
| *G06F 15/173* | (2006.01) |
| *H04L 12/917* | (2013.01) |
| *H04L 29/08* | (2006.01) |
| *H04L 12/24* | (2006.01) |
| *H04L 12/26* | (2006.01) |

(52) U.S. Cl.
CPC ............ *H04L 47/76* (2013.01); *H04L 67/10* (2013.01); *H04L 41/5012* (2013.01); *H04L 43/0817* (2013.01)

(58) Field of Classification Search
CPC ........ H04W 8/245; H04L 47/76; H04L 67/10; H04L 41/5012; H04L 43/0817

USPC .......................................... 709/226
See application file for complete search history.

(56) References Cited

U.S. PATENT DOCUMENTS

| | | | |
|---|---|---|---|
| 2002/0052205 A1* | 5/2002 | Belostotsky | H04L 12/2801 455/452.2 |
| 2008/0229319 A1* | 9/2008 | Marchand | G06F 9/4856 718/104 |
| 2012/0202549 A1* | 8/2012 | Eriksson | H04W 28/16 455/513 |

(Continued)

OTHER PUBLICATIONS

"Pre-emptive Scheduling of On-line Real Time Services With Task Migration for Cloud Computing" by Santhosh and Ravichandran (Proceedings of the 2013 International Conference on Pattern Recognition, Informatics and Mobile Engineering (Prime) Feb. 21-22, p. 275).*

*Primary Examiner* — John MacIlwinen
*Assistant Examiner* — Tan Doan
(74) *Attorney, Agent, or Firm* — Goodwin Procter LLP

(57) ABSTRACT

Described are computer-based methods and apparatuses, including computer program products, for leveraging available compute resources from a plurality of computing devices using containers. Each computing device from the plurality of computing devices executes a container that virtualizes a portion of an operating system executing on the computing device such that the container can execute one or more secondary applications in isolation from any incumbent applications being executed by the operating system on the computing device that have priority over the one or more secondary applications.

16 Claims, 13 Drawing Sheets

(56) References Cited

U.S. PATENT DOCUMENTS

2014/0282503 A1\* 9/2014 Gmach ............... H04L 41/0823
   718/1
2015/0120928 A1\* 4/2015 Gummaraju ........ H04L 67/1008
   709/226

\* cited by examiner

ELASTIC COMPUTE CLOUD BASED ON UNDERUTILIZED SERVER RESOURCES USING A DISTRIBUTED CONTAINER SYSTEM

CROSS REFERENCE TO RELATED APPLICATIONS

This application claims priority under 35 U.S.C. §119(e) of U.S. Provisional Application No. 61/948,375, filed Mar. 6, 2014, entitled "HYBRID AND PLATFORM-INDEPENDENT VIRTUAL PRIVATE CLOUD," and U.S. Provisional Application No. 62/045,165, filed Sep. 3, 2014, entitled "ELASTIC COMPUTE CLOUD BASED ON UNDERUTILIZED SERVER RESOURCES USING DISTRIBUTED CONTAINER SYSTEM," the entire contents of which are incorporated by reference herein in their entirety.

TECHNICAL FIELD

The present disclosure relates to computerized systems and methods for an elastic compute cloud based on underutilized server resources using a distributed container system, and a hybrid and platform-independent virtual private cloud.

BACKGROUND

Server utilization in most enterprises leveraging on-premises data centers and private clouds is shockingly low, typically less than 50% for virtualized and 20% for physical servers, due to business (e.g., risks), cultural (e.g., "we don't share"), and technical (e.g., scheduling) challenges. Public cloud utilization is also low, typically less than 40%.

Parallel computing, which can be used to refer to the act of leveraging multiple computing resources in parallel to speed up tasks, has been widely deployed to increase computing performance. This principle can manifest itself using many technologies. Some examples of physical parallel computing technologies are chip multiprocessors, data centers, and high-performance computing systems, most of which consist of seed building blocks (processing cores, servers, server racks, etc.) that are replicated and deployed in parallel.

There exist different technologies to leverage the performance of dedicated clusters of computers. These technologies can enable ubiquitous computing systems, such as cloud computing services, which run parallel computing environments in data centers and high-performance computing systems. These technologies have enabled individuals and organizations to access powerful computing environments.

SUMMARY

The techniques described herein can provide for lightweight and platform-agonistic containers that can be executed in a compute resource (e.g., server, desktop, smartphone, and/or the like) to leverage spare compute capacity of the compute resource. A plurality of different types of compute resources can be combined to provide a virtual private cloud of spare compute resources to execute available applications.

In some examples, a container is a method of operating system virtualization that can allow applications to run on a compute device in a manner that is isolated from other processes. Unlike typical virtual machines, the containers can be relatively lightweight (e.g., a few 100 MB for a container compared to 20-30 GB for a typical virtual machine). Containers can be created and distributed to various compute resources. Prior to installation of a container, each computer server includes its hardware, operating system, software etc., and typically the server is configured to execute one or more incumbent applications (e.g., applications that are to be provided by the server, such as a web server). Such incumbent applications may have a high priority for the system since the goal of the server is to provide such applications. A container can be installed on such a server so that when there is idle capacity (e.g., the incumbent application(s) are not utilizing the full compute resources available) then secondary applications can be executed to better utilize resources of the compute resources. The containers can be configured to yield to the incumbent applications if they require additional compute resources. For example, by configuring the secondary applications to yield to high priority applications the containers provide for a way to back off resources in real-time.

The techniques described herein include resource monitors that can configure and distribute where secondary applications are executed in the system (e.g., in which container on which device, based on current available resources). The system can include an external resource monitor to measure various computing parameters (e.g., CPU utilization, memory, storage, bandwidth, memory input/output, and/or the like) for the various compute resources. The techniques can also include internal monitors executing on the compute resources. These techniques can be used to distribute the secondary applications among the compute resources (e.g., computer servers), such as by making intelligent decisions on how to distribute secondary applications based on the compute parameters.

The techniques can be configured to update in real-time to adjust to the fact that the resources are constantly changing over time. For example, if a compute server was available at some point in time, unexpected incumbent application use may cause it to no longer be available. As explained in detail herein, the secondary application execution profile can be adjusted based on incumbent application use so that the secondary application execution essentially has an inverse profile compared to that of the execution of the incumbent applications over time (e.g., as incumbent resources decrease, the secondary application use of those resources can increase). In some examples, using both internal and external monitors can allow secondary application distribution decisions to be made in real-time (e.g., the internal resource monitor and external resource monitor can cooperatively work together to make decisions in real-time on each node to avoid latency hits).

The techniques described herein can provide for using a hybrid approach to utilizing computer resources. For example, a hybrid of device types (e.g., personal computers, smart phones, data center servers, and/or the like) and techniques (e.g., web browsers, distributed containers, and/or the like) can be used to access underutilized resources and provide them to a user in a virtual private cloud so that idol capacity from these various device types can be used to run other applications.

In some embodiments, the techniques provide for a computing system for leveraging available compute resources from a plurality of computing devices using containers. Each computing device from the plurality of computing devices executes a container that virtualizes a portion of an operating system executing on the computing device such that the container can execute one or more secondary applications in isolation from any incumbent applications being executed by the operating system on the computing device that have priority over the one or more secondary applications. The computing system includes a memory and a processor in communication with the memory configured to execute instructions stored on the memory that cause the processor to receive data from each of a plurality of computing devices in communication with the computing system, wherein each computing device from the plurality of computing devices is executing a container that virtualizes a portion of an operating system executing on the computing device such that the container can execute one or more secondary applications in isolation from any incumbent applications being executed by the operating system on the computing device, and the data comprises data indicative of resource metrics for an operating system, a container, or both, for each of the plurality of computing devices. The instructions cause the processor to determine available compute resources on one or more of the plurality of computing devices based on the data, such that the available compute resources will not interfere with execution of incumbent applications on each of the one or more computing devices. The instructions cause the processor to schedule a secondary application for execution by a container on each of the one or more computing devices with available computing resources so that available compute resources on the one or more computing devices can be leveraged to execute the secondary application.

In some embodiments, the techniques provide for a computing system configured to leverage available compute resources on the computing system by executing a container that virtualizes a portion of an operating system executing on the computing system such that the container can execute one or more secondary applications in isolation from any incumbent applications being executed by the operating system that have priority over the one or more secondary applications. The computing system includes a memory and a processor in communication with the memory configured to execute instructions stored on the memory that cause the processor to transmit data to an application management engine in communication with the computing system and a set of computing devices, wherein the data is indicative of resource metrics for an operating system executing on the computing device, a container executing on the computing system that virtualizes a portion of the operating system such that the container can execute one or more secondary applications in isolation from any incumbent applications being executed by the operating system that have priority over the one or more secondary applications, or both. The instructions cause the processor to receive, from the application management engine, a secondary application to execute using the container. The instructions cause the processor to execute the secondary application using the container so that available compute resources of the computing system can be leveraged to execute the secondary application.

In some embodiments, the techniques provide for a computerized method for leveraging available compute resources from a plurality of computing devices using containers. Each computing device from the plurality of computing devices executes a container that virtualizes a portion of an operating system executing on the computing device such that the container can execute one or more secondary applications in isolation from any incumbent applications being executed by the operating system on the computing device that have priority over the one or more secondary applications. The computerized method includes receiving, by a computing system comprising a processor and a memory, data from each of a plurality of computing devices in communication with the computing system, wherein each computing device from the plurality of computing devices is executing a container that virtualizes a portion of an operating system executing on the computing device such that the container can execute one or more secondary applications in isolation from any incumbent applications being executed by the operating system on the computing device, and the data comprises data indicative of resource metrics for an operating system, a container, or both, for each of the plurality of computing devices. The computerized method includes determining, by the computing system, available compute resources on one or more of the plurality of computing devices based on the data, such that the available compute resources will not interfere with execution of incumbent applications on each of the one or more computing devices. The computerized method includes scheduling, by the computing system, a secondary application for execution by a container on each of the one or more computing devices with available computing resources so that available compute resources on the one or more computing devices can be leveraged to execute the secondary application.

In some embodiments, the techniques provide for a computerized method for leveraging available compute resources on the computing system by executing a container that virtualizes a portion of an operating system executing on the computing system such that the container can execute one or more secondary applications in isolation from any incumbent applications being executed by the operating system that have priority over the one or more secondary applications. The computerized method includes transmitting, by the computing system, data to an application management engine in communication with the computing system and a set of computing devices, wherein the data is indicative of resource metrics for an operating system executing on the computing device, a container executing on the computing system that virtualizes a portion of the operating system such that the container can execute one or more secondary applications in isolation from any incumbent applications being executed by the operating system that have priority over the one or more secondary applications, or both. The computerized method includes receiving, by the computing system, from the application management engine, a secondary application to execute using the container. The computerized method includes executing, by the computing system, the secondary application using the container so that available compute resources of the computing system can be leveraged to execute the secondary application.

These and other capabilities of the disclosed subject matter will be more fully understood after a review of the following figures and detailed description. It is to be understood that the phraseology and terminology employed herein are for the purpose of description and should not be regarded as limiting.

BRIEF DESCRIPTION OF THE FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
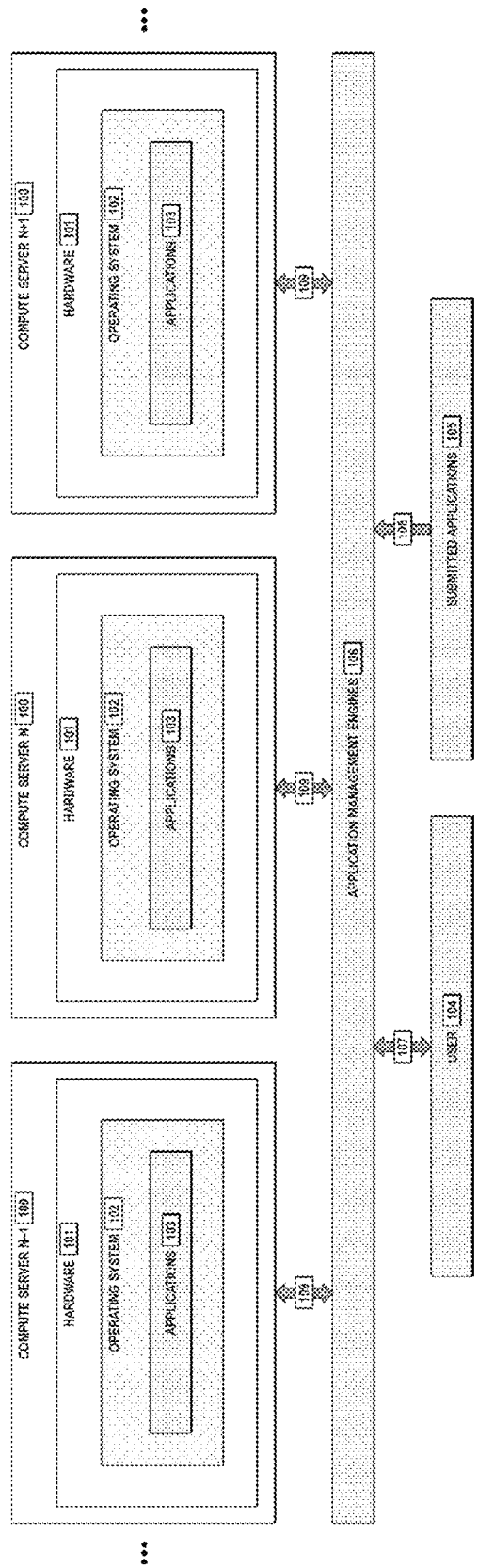
FIG. 1 is an exemplary system diagram of a distributed container system in accordance with some embodiments.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Disclosed herein is an Elastic Compute Cloud Framework that is capable of creating an elastic compute cloud out of underutilized enterprise server resources. Furthermore, this Framework allows enterprises to transparently run more workloads on their paid-for but unused resources. For organizations that offer server resources to their customers with an infrastructure as a service (IaaS) model, they would have the opportunity to redeploy provisioned but unused/idle resources for any server, independent of whether it has already been provisioned to a customer.

This Framework is capable of operating in any combination of on-premises data centers, private clouds, public clouds, and/or any other environment such as a server-rich environment. The specific resources for which the resource utilization is increased by the Framework may be CPUs, RAM, GPUs, storage, network bandwidth, and memory bandwidth. Organizations that leverage this Framework may significantly reduce their computing costs over acquiring more hardware or cloud resources. Because of the platform-agnostic approach to this Framework, it is also complementary to most existing systems, including any virtualized and non-virtualized environments, and is able to operate without interfering with the primary tasks of those systems nor the surrounding hardware resources.

These and other capabilities of the disclosed subject matter will be more fully understood after a review of the following figures and detailed description. It is to be understood that the phraseology and terminology employed herein are for the purpose of description and should not be regarded as limiting.

Various objectives, features, and advantages of the disclosed subject matter can be more fully appreciated with reference to the following detailed description of the disclosed subject matter when considered in connection with the following drawings, in which like reference numerals identify like elements.

Exemplary Framework Concepts

FIG. 1 depicts an exemplary embodiment of the generalized framework concept. This figure includes the Compute Server(s) (100) (e.g. Compute Server N−1, Compute Server N, and Compute Server N+1), which may operate within a client-server architecture, respond to requests across a computer network to provide, or help to provide a networked service. This may be part of a system that deploys one or more of these Compute Servers (100). The Compute Server (100) typically comprises Hardware (101), Operating System (102), and Software (103).

The Compute Servers (100) may be deployed with many different types of functionalities, including but not limited to, any combination of application servers, communications servers, compute servers, database servers, file servers, game servers, mail servers, and web servers. Many enterprises deploy systems with Compute Servers (100) performing many different and varying types of functionalities in a hybrid manner.

FIG. 1 also includes Hardware (101), which are the physical and/or virtualized elements that constitute the Compute Server (100). This may include, but is not limited to, physical and/or virtualized devices such as motherboards, central processing units (CPUs), including the cores of a multi-core processor, CPUs in a multi-CPU system, or chips in a multi-chip module (MCM), graphics processing units (GPUs), random-access memory (RAM), computer data storage such as hard drive disks (HDDs) or solid-state drives (SSDs), and network connections. The Hardware (101) may also be based on any programmable model such as field-programmable gate array (FPGA) and complex programmable logic device (CPLD) technology, any non-programmable model such as application-specific integrated circuit (ASIC) technology, or any hybrid combination thereof.

FIG. 1 also includes Operating System (102), which is the software layer on top of which other software programs, such as Applications (103) and Submitted Applications (105), can run on the Hardware (101) of the Compute Server (100). For certain instantiations the Operating System (102)

may be, but is not limited to, variants of Linux such as Debian-based Ubuntu, Red Hat Enterprise Linux (RHEL), SUSE Linux Enterprise Server (SLES), Debian, and Community Enterprise Operating System (CentOS). The Operating System (102) may also be, but is not limited to, any UNIX-like distributions based on systems such as Linux, BSD, and Solaris, or other types of distributions such as Windows Server and Mac OS X Server.

FIG. 1 also includes Applications (103), which are software programs that run on the Hardware (101) of the Compute Server (100). These may be, but are not limited to, executable files, libraries, and scripts. Some or all Applications (103) may leverage, comprise, or be derivatives of Submitted Applications (105).

FIG. 1 also includes User (104), which is either a manual or automatic (or both) remote user that has access to the system. A manual user may be a human being, while an automatic user may be an automated script, all of which have access to, and perform functions on, the Elastic Compute Cloud Framework.

FIG. 1 also includes Submitted Applications (105), which are Applications (103) that have been remotely submitted into the system by the User (104). In most instantiations, once submitted into the system, the Submitted Applications (105) are distributed to select Compute Servers (100) using Application Management Engines (106).

FIG. 1 also includes Application Management Engines (106), which may perform several functionalities including (but not limited to): (a) Facilitating communication between the User (104) and the Compute Servers (100). In some instantiations, the Application Management Engines (106) may also facilitate communication between Compute Servers (100), in a peer-to-peer (P2P) environment; (b) Providing an interface for the User (104) to submit the Submitted Applications (105), obtain any system status information, view and modify task queues, configure preferences, or perform any maintenance and software upgrades. In some instantiations, this may be accomplished through a command-line interface (CLI) or website access. (c) Providing interface for, and controlling the distribution of, the Submitted Applications (105) to select Compute Servers (100). This may be based on specified or predetermined algorithms and heuristics; (d) Gathering the related results and responses from deployed Submitted Applications (105) on the Compute Servers (100); (e) Keeping track of all the available Compute Servers (100) in the system, and any relevant Hardware (101), Operating System (102), and Applications (103) states of the Compute Servers (100). (f) Workload automation.

Each Application Management Engine (106) in the system may run either on a single server, or on multiple servers in a distributed fashion.

FIG. 1 also includes communication links between the building blocks, such as (107), the communication between the User (104) and the Application Management Engines (106). This is how the User (104) may submit the Submitted Applications (105), obtain any system status information, view and modify task queues, configure preferences, or perform any maintenance and software upgrades.

FIG. 1 also includes communication link (108), the communication between the Submitted Applications (105) and the Application Management Engines (106). The Submitted Applications (105) are sent to the Application Management Engines (106) through this communication links.

FIG. 1 also includes communication link (109), the communication between the Application Management Engines (106) and any number of Compute Servers (100). This allows the Application Management Engines (106) to: (a) Provide an interface for, and control the distribution of, the Submitted Applications (105) to select Compute Servers (100); (b) Gather the related results and responses from deployed Submitted Applications (105) on the Compute Servers (100); (c) Keep track of all the available Compute Servers (100) in the system, and any relevant Hardware (101), Operating System (102), and Applications (103) states of the Compute Servers (100).

Figure 2:
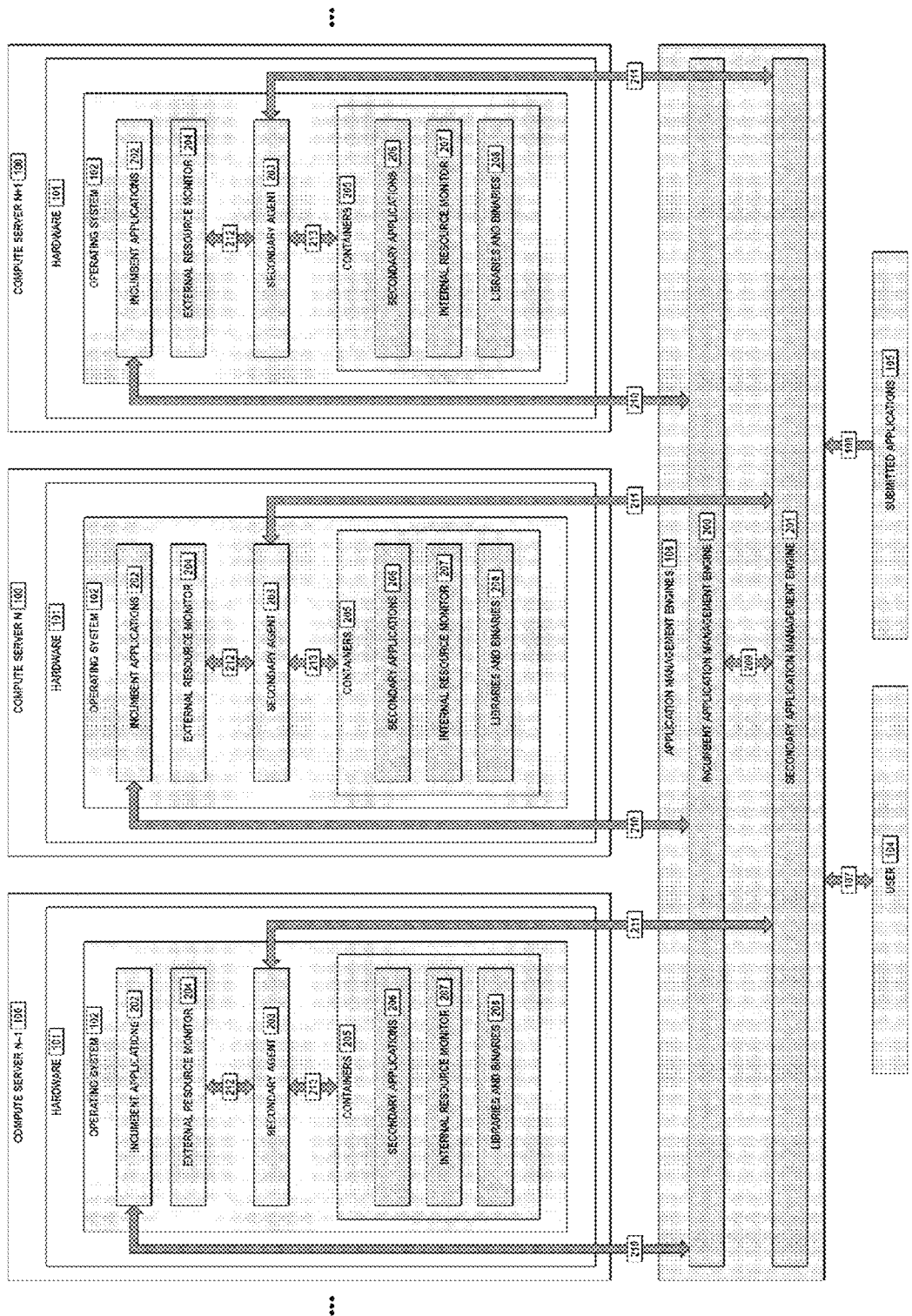
FIG. 2 is an exemplary system diagram of an elastic compute cloud framework in accordance with some embodiments.

FIG. 2 depicts an exemplary embodiment of the Elastic Compute Cloud Framework concept. One difference between the systems depicted in FIG. 1 and FIG. 2, is that the system depicted in FIG. 2 separates Applications (103) and Application Management Engines (106) into two environment classifications, Incumbent Environment (300) and Secondary Environment (301), which are also depicted in the exemplary embodiment in FIG. 3.

FIG. 2 also includes Incumbent Application Management Engine (200), which is an Application Management Engine (106) that may be used to manage and deploy Incumbent Applications (202), as part of the Incumbent Environment (300) in the system. In some instantiations, the Incumbent Application Management Engine (200) may be any job scheduler, batch-queuing system, distributed resource management system (DRMS), distributed resource manager (DRM), or any other system that enables workload automation. Some example available technologies for this include Univa Grid Engine, IBM Platform systems such as Symphony and LSF (Load Sharing Facility), Moab, Argent Job Scheduler, Portable Batch System (PBS), IBM Tivoli Workload Scheduler (TWS) LoadLeveler, HTCondor, OAR, and Simple Linux Utility for Resource Management (SLURM). Some of these technologies may provide solutions for applications associated with grid computing, high-performance computing (HPC), and high-throughput computing (HTC).

FIG. 2 also includes Secondary Application Management Engine (201), which is an Application Management Engine (106) that may be used to manage and deploy Secondary Applications (202), as part of the Secondary Environment (301) in the system. The decision of the Secondary Application Management Engine (201) on which Compute Servers (100) to deploy Secondary Applications (202) may be assisted with, but not limited to, any combination of: (a) User (104) specifications; (b) Resource availability and utilization; (c) Job priority; (d) Historical data, including the use of machine learning; (e) Estimated execution time; (f) Execution time preference; (g) Elapsed execution time; (h) Security boundaries in the network and/or organization; (i) Number of simultaneous other jobs; (j) Occurrence of specified events; (k) Redundancy specifications; (l) License key specifications for any licensed software.

If there is an abundance of resources, for example many Compute Servers (100) with unused/idle resources, and execution time preference is to minimize the execution time, the Secondary Application Management Engine (201) may further implement redundancy methods to achieve the shortest execution time.

FIG. 2 also includes Incumbent Applications (202), which are Applications (103) that are part of the Incumbent Environment (300). FIG. 2 also includes Secondary Agent (203), which is the interface to each Compute Server (100) from the Secondary Application Management Engine (201). The Secondary Agent (203) is capable of: (a) Deploying and managing software on the Compute Servers (100) for the Secondary Environment (301), such as the External Resource Monitor (204) and Containers (205); (b) Gathering and storing the resource states and metrics from the External Resource Monitor (204), as well as the Internal Resource Monitor (207), and sending this data to the Secondary Application Management Engine (201); (c) Making intelligent decisions about the deployment and management of the Containers (205) based on current and/or historic resource states and metrics from the External Resource Monitor (204) and/or the Internal Resource Monitor (207), and any other states, metrics, or heuristics in the system. These decisions may be made locally to the Compute Server (100), globally to the system or any subsystem, or any combination thereof.

In some instantiations, the Secondary Agent (203) is capable of making decisions about adjusting the resource utilization of the Containers (205) based on these resource states and metrics. This may be done local to each corresponding Compute Server (100), without requiring communication with the Secondary Application Management Engine (201) for this purpose. This enables completely elastic, dynamic, and instantaneous resource yield as soon as higher-priority Applications (103) need the resources, and redeployment as soon as those resources become available. This also reduces the communication bandwidth between the Compute Servers (100) and the Secondary Application Management Engine (201).

FIG. 2 also includes External Resource Monitor (204), which gathers and stores resource states and metrics of the Operating System (102) and its underlying Hardware (101). This may include, but is not limited to, such metrics as capacity and/or utilization of the CPUs, RAM, GPUs, storage, network bandwidth, and memory bandwidth.

FIG. 2 also includes Containers (205), which may leverage server virtualization methods such as operating system-level virtualization, where the kernel of an Operating System (102) allows for multiple isolated user space instances, instead of just one. Some instances of this may include, but are not limited to, containers, virtualization engines (VEs), virtual private servers (VPS), jails, or zones, and/or any hybrid combination thereof.

Some example available technologies for Containers (205) include chroot, Docker, Linux-VServer, lmctfy ("let me contain that for you"), LXC (Linux containers), OpenVZ (Open Virtuozzo), Parallels Virtuozzo Containers, Solaris Containers (and Solaris Zones), FreeBSD Jail, sysjail, WPARs (workload partitions), HP-UX Containers (SRP, secure resource partitions), iCore Virtual Accounts, and Sandboxie.

Figure 4:
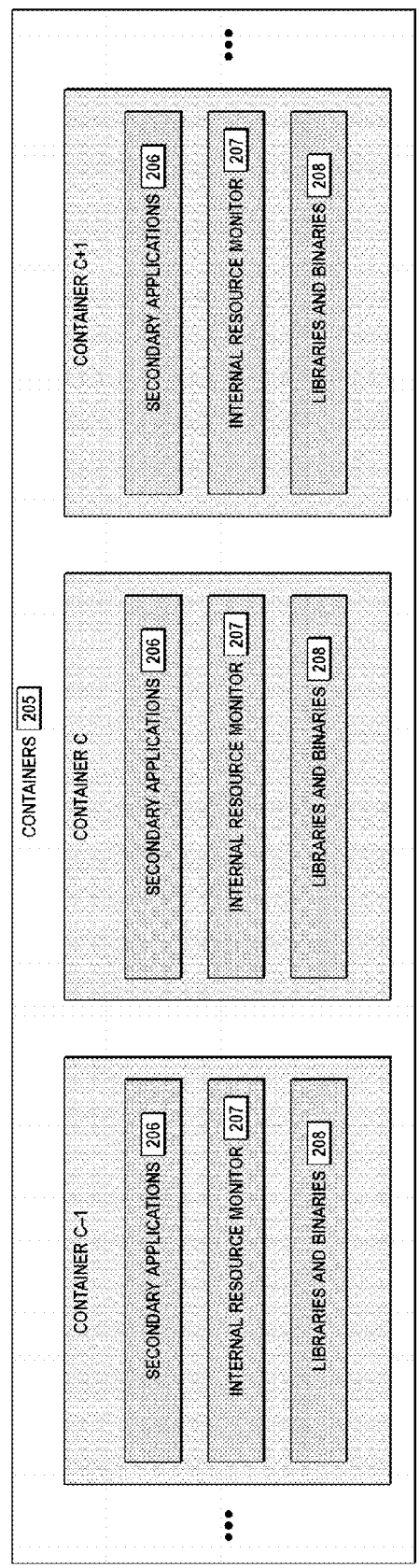
FIG. 4 is an exemplary diagram of multiple containers in accordance with some embodiments.

In some instantiations, there may be one or more Containers (205) on each participating Compute Server (100). FIG. 4 depicts an exemplary embodiment of multiple containers (e.g. Container C-1, Container C, and Container C+1).

FIG. 2 also includes Secondary Applications (206), which are Applications (103) that are part of the Secondary Environment (301). FIG. 2 also includes Internal Resource Monitor (207), which gathers and stores resource states and metrics inside the Containers (205) and their underlying Hardware (101). This may include, but is not limited to, such metrics as capacity and/or utilization of the CPUs, RAM, GPUs, storage, network bandwidth, and memory bandwidth.

FIG. 2 also includes Libraries and Binaries (208), which comprises two supportive components for participating Compute Servers (100) in the system: (a) The libraries component may comprise standard and/or custom libraries of compiled languages and software systems; (b) The binaries component may be computer files that are completely functional Applications (103) that do not require installers (as opposed to source code).

FIG. 2 also includes communication links between the building blocks, such as (209), which in some instantiations is the communication between the Incumbent Application Management Engine (200) and the Secondary Application Management Engine (201). This may be accomplished through an application programming interface (API) and/or a shim between the two systems.

FIG. 2 also includes communication link (210), the communication between the Incumbent Application Management Engine (200) and the Incumbent Applications (202). FIG. 2 also includes communication link (211), the communication between the Secondary Application Management Engine (201) and the Secondary Agent (203). FIG. 2 also includes communication link (212), the communication between the Secondary Agent (203) and the External Resource Monitor (204). FIG. 2 also includes communication link (213), the communication between the Secondary Agent (203) and the Containers (205).

Figure 3:
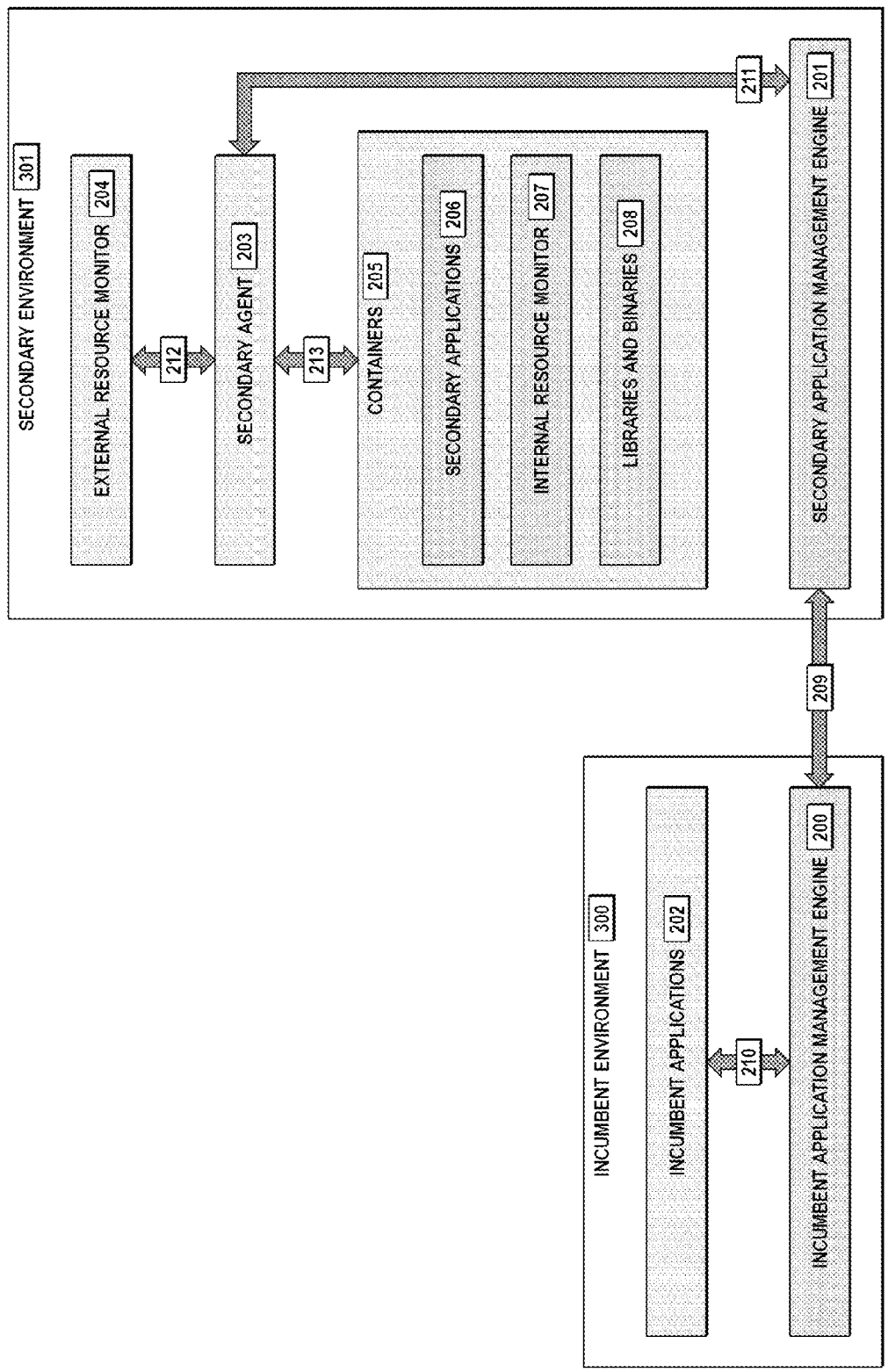
FIG. 3 is an exemplary system diagram of an incumbent environment and a secondary environment in accordance with some embodiments.

FIG. 3 depicts an exemplary embodiment of the two aforementioned environment classifications. This figure includes Incumbent Environment (300), which is the environment in which the Incumbent Applications (202) get deployed on the Compute Servers (100). The Incumbent Environment (300) comprises any Incumbent Applications (202) running on the Compute Servers (100), independent of the presence of the Secondary Environment (301). In some instantiations, the Incumbent Applications (202) consist of software running on the Compute Servers (100) with resource priority, and their resource utilization requirements may take priority in the presence of the Secondary Environment (301).

FIG. 3 also includes Secondary Environment (301), which is the environment in which the Secondary Applications (206) get deployed on the Compute Servers (100). The Secondary Environment (301) comprises any Secondary Applications (206) running on the Compute Servers (100), independent of the presence of the Incumbent Environment (300). In some instantiations, the Secondary Applications (206) consist of software running on the Compute Servers (100) with designated resource priority, and their resource utilization depends on the resource utilization of the Incumbent Environment (300).

Operational Example

In one operational example of the Elastic Compute Cloud Framework concept, the User (104) may submit Submitted Applications (105) into the system, and these Submitted Applications (105) are fed to the Application Management Engines (106). The Application Management Engines (106) are aware of the available Compute Server (100) resources, and make intelligent decisions about distributing to select Compute Servers (100).

In this example, the User (104) submits a combination of Submitted Applications (105) that are bound for being deployed as Incumbent Applications (202) and Secondary Applications (206). In other example instantiations, these Submitted Applications (105) may be bound for only Incumbent Applications (202) or Secondary Applications (206) in one or several Containers (205).

In this example, some of the Submitted Applications (105) from the User (104) are bound for the Incumbent Environment (300), and are managed and deployed by the Incumbent Application Management Engine (200), which may be a standard job scheduler. This job scheduler makes decisions about which Compute Servers to deploy these Submitted Applications (105) as Incumbent Applications (202) based on standard job scheduling techniques.

Other Submitted Applications (105) from the User (104) are bound for the Secondary Environment (301), and are managed and deployed by the Secondary Application Management Engine (201). These Submitted Applications (105) are placed in Containers (205) as Secondary Applications (205). This containerization (sometimes referred to as "Dockerization" when deploying Docker), may be performed at the Secondary Application Management Engine (201), which may physically reside as a separate back-end server, or at each Compute Server (100). It may also be performed completely automatically, or with some interaction from the User (104). In some examples, the Submitted Applications (105) may already be containerized (sometimes referred to as "Dockerized" when deploying Docker) when being submitted into the system by the User (104).

The decision of the Secondary Application Management Engine (201) on which Compute Servers (100) to deploy Submitted Applications (105) as Secondary Applications (202) may be determined by many factors. These factors may be specified by the User (104) at any time, or are automatically determined based on current, historical, or predictive data for the resource utilization. The deployment may also be determined based on known performance-increasing methods such as matching CPU-bound Applications (103) with memory-bound Applications (103) on the same Compute Server (100). The decision about which Submitted Applications (105) are bound as Incumbent Applications (202) and which are bound as Secondary Applications (206) are also be determined by similar factors, if they are not defined explicitly by the User (104).

The resource utilization data is constantly gathered by the External Resource Monitor (204) and Internal Resource Monitor (207) for each Compute Server (100), and is sent to the Secondary Application Management Engine (201) through the Secondary Agent (203). The External Resource Monitor (204) gathers and stores resource states and metrics of the Operating System (102) and its underlying Hardware (101), while the Internal Resource Monitor (207) gathers and stores resource states and metrics inside the Containers (205) and their underlying Hardware (101). Once the Secondary Application Management Engine (201) receives the resource utilization data from each Compute Server (100), it can also perform analytics on it to assist in making decisions about which Compute Servers (100) to deploy the Submitted Applications (105).

Once Incumbent Applications (202) and Secondary Applications (206) are deployed across a number of Compute Servers (100), resource contention is avoided by yielding and grabbing resources for some Applications (103) relative to others in real time. The low-latency nature of this elastic, dynamic, and instantaneous resource yield comes from the ability for the system to make resource yield and grab decision local to each Compute Server (100), without having to communicate with the Secondary Application Management Engine (201), which may be a separate back-end server. Other instantiations of this method can allow the resource yield and grab to make decisions based on a combination of factors local to the Compute Server (100) as well as global system factors coming from the Secondary Application Management Engine (201).

In some embodiments, the decision-making process for the real-time resource yield and grab may implemented with various algorithms, and may be assisted with the live data gathered by the External Resource Monitor (204) and the Internal Resource Monitor (207). One such exemplary algorithm is the real-time resource (e.g. CPU) yield and grab component that can allow lower-priority processes, such as Secondary Applications (206), to utilize spare resources (e.g. CPU cycles) without interfering with the resource requirements of higher-priority processes, such as Incumbent Applications (202). One example instantiation of this concept consists of several operational stages: (a) Kernel Stage: in this stage, the system sets Secondary Applications (206) to the lowest possible priority (e.g. idle priority), and passively monitors the running processes. When Incumbent Applications (202) start, the kernel dedicates the required resources to their normal/high priority processes. Furthermore, a threshold-based algorithm can then detect a resource demand spike of a particular process and initiate the next stage of the algorithm: the User Stage; (b) User Stage: in this stage, the system actively pauses the process or container to allow the Incumbent Application (206) to use all the resources it requires. This may be done via, but is not limited to, a command such as "kill-STOP", or via a container pause request. The Secondary Applications (206) can then be resumed once the Incumbent Applications (202) are finished using the resources, or their state can be transferred to a different Compute Server (100) to finish.

Exemplary Framework Use Cases

The exemplary embodiment of the Elastic Compute Cloud Framework concept in FIG. 2 may have many use cases within a wide variety of physical and virtual computing environments, such as, but not limited to, an organization that leverages many different types of servers in the company, with many different types of Incumbent Applications (202) running in the Incumbent Environment (300). This organization may choose, in any hybrid fashion, to perform various described example scenarios.

Figure 5:
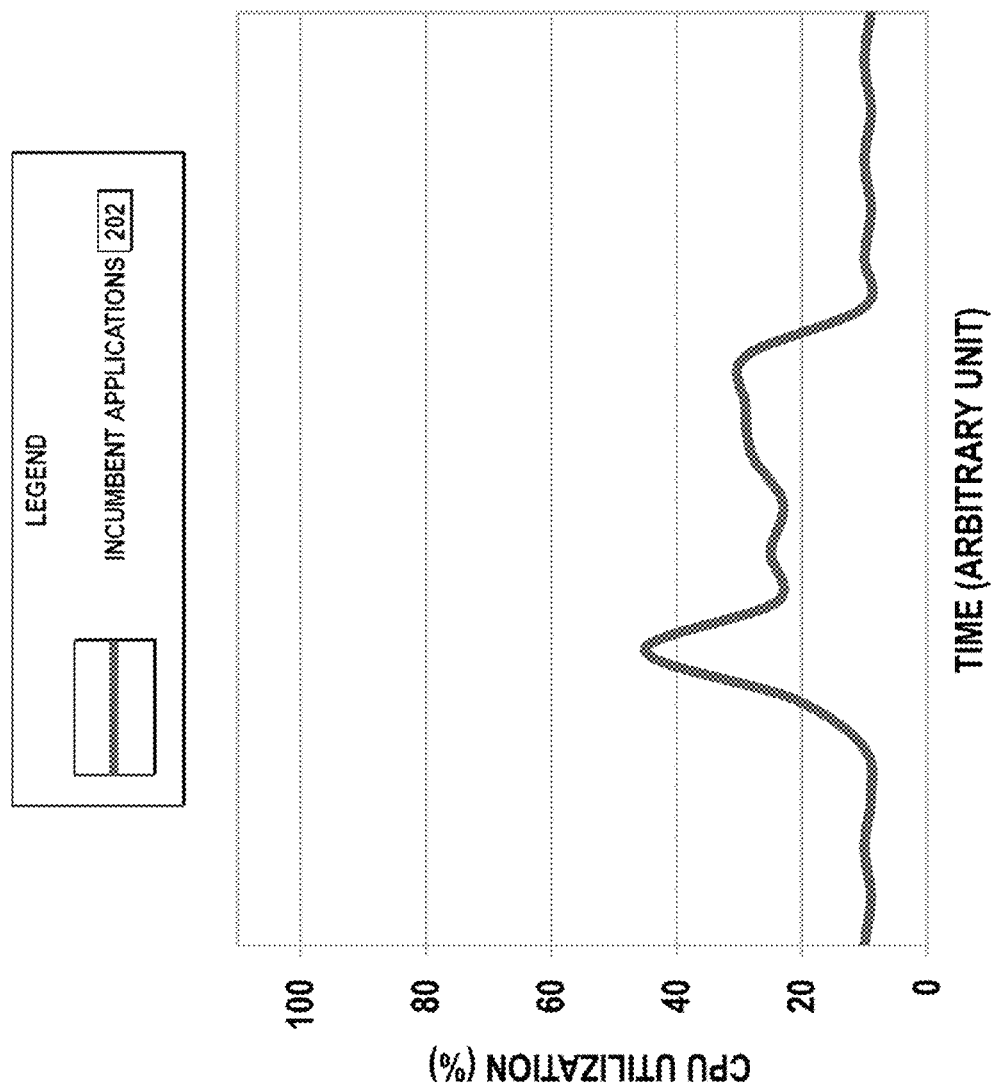
FIG. 5 is an exemplary diagram illustrating incumbent application CPU utilization over time in accordance with some embodiments.

One example scenario this organization may choose to perform is to run the Incumbent Applications (202) in the Incumbent Environment (300), without running the Secondary Applications (206) in the Secondary Environment (301). FIG. 5 shows an exemplary embodiment of this concept, with an example of CPU utilization, shown as a percentage of total capacity over time. FIG. 5 shows an example plot which may be a measurement of a single Compute Server (100) running the Incumbent Applications (202), or an average of many Compute Servers (100) running the Incumbent Applications (202). In FIG. 5, the Incumbent Applications (202) spike up or down at will, as determined by this specific workflow example.

Figure 6:
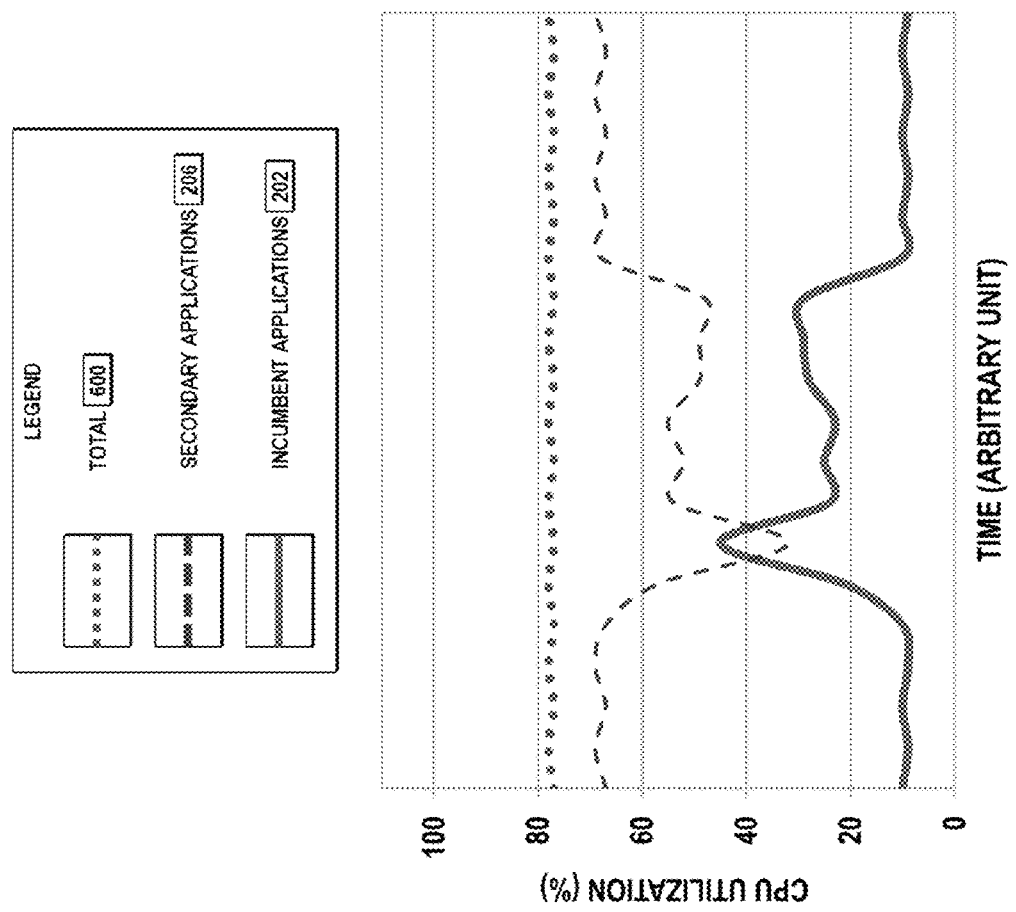
FIG. 6 is an exemplary diagram illustrating incumbent application CPU utilization and secondary application CPU utilization over time in accordance with some embodiments.

Another example scenario this organization may choose to perform is to by default, keep the Incumbent Applications (202) running in the Incumbent Environment (300) with primary resource priority to make sure that their operations and performance are not impacted by anything running in the Secondary Environment (301). Furthermore, they may assign a particular set of Secondary Applications (206) to the Secondary Environment (301), and keep them with secondary priority to make sure that they do not impact the operations and performance of anything running in the Incumbent Environment (300). In this case, the Secondary Applications (206) run only on the unused/idle resources of the Compute Servers (100), with secondary resource priority. FIG. 6 shows an exemplary embodiment of this concept, with an example of CPU utilization, shown as a percentage of total capacity over time. FIG. 6 shows an example plot which may be a measurement of a single Compute Server (100) running the Incumbent Applications (202), or an average of many Compute Servers (100) running the Incumbent Applications (202). In FIG. 6, the CPU utilization profile of the Incumbent Applications (202) remains equivalent to the one depicted in FIG. 5, showing that the Incumbent Applications (202) are not affected by the Secondary Applications (206) in the Secondary Environment (301). Furthermore, FIG. 6 shows that as soon as the Incumbent Applications (202) spike up or down at will, the Secondary Applications (206) spike in the opposite direction to compensate. The Total (600) represents the combined CPU utilization of the Incumbent Applications (202) and the Secondary Applications (206), and in this depiction remains relatively steady over time.

Another example scenario this organization may choose to perform is to assign priority to some or every Incumbent Application (202) in the Incumbent Environment (300) and Secondary Application (206) in the Secondary Environment (301). This priority may either be explicit, defined and tagged for each workflow, or inferred based on any other metric in the Elastic Compute Cloud Framework, or any combination thereof.

Another example scenario this organization may choose to perform is to run both Incumbent Application (202) in the Incumbent Environment (300) and Secondary Application (206) in the Secondary Environment (301) as is. The lack of priority may create resource contention.

Another example scenario this organization may choose to perform is to run every application as Secondary Applications (206) in the Secondary Environment (301), with or without priority, without running Incumbent Application (202) in the Incumbent Environment (300).

Another example scenario this organization may choose to perform is to create an Elastic Compute Cloud Framework with any aforementioned option, and sell, lease, trade, or otherwise redistribute in any manner any access resource capacity that the organization may have, to any other organization.

Another example scenario this organization may choose to perform is for organizations that offer server resources to their customers with an IaaS model, they would have the opportunity to redeploy provisioned but unused/idle resources. For example, an organization offering public cloud resources to its customers under an IaaS model is able to leverage this Framework to redeploy any unused/idle resources that customers have provisioned but are not fully utilizing. This redeployment may be a resource offering to either the same or other customers, possibly for a fee. This approach is similar to the Spot Instances of the Amazon Elastic Compute Cloud, except instead of redeploying full Compute Servers (100) that haven't yet been provisioned, this Framework is capable of redeploying unused/idle resources of any Compute Server (100), even if has been provisioned.

There are several major benefits for organizations to deploy with these Elastic Compute Cloud Framework methods. One major benefit for organizations is to increase the utilization of their existing server infrastructure, independent of whether their infrastructure is any combination of on-premises data centers, private clouds, public clouds, or any other server-rich environment. The specific resources for which the resource utilization is increased may be, but are not limited to, CPUs, RAM, GPUs, storage, network bandwidth, and memory bandwidth. For each resource type, utilization improvement may be calculated at any point in time or for a time given average. For example, server improvement of average CPU utilization may be calculated between the average CPU utilization of Incumbent Applications (202) in FIG. 5, for example 15%, and average CPU utilization of Total (600) in FIG. 6, for example 78%. In this example, there is a 78%÷15%=5.2×average CPU utilization improvement.

Another major benefit for organizations is to run more Applications (103) on already-paid-for but unused resources, such as running Secondary Applications (206) on the unused/idle resources of the Compute Servers (100), with secondary resource priority.

Another major benefit for organizations is that in the cases where the organization may be using other elastic compute cloud resources that are paid for by unit such as quantity, capacity, capability, or availability, they may choose to provision fewer of those resources and instead offset the computations to the resources made available by the Elastic Compute Cloud Framework. This may be a cost-effective option since they would be offsetting this computation to resources that they have already paid for, rather than paying for other elastic compute cloud resources. In one example instantiation, the organization may be using public cloud resources whenever their on-premises data centers or private clouds reach beyond a set threshold resource utilization. Using the aforementioned method, the organization would be able to offset some or all of the computations bound for the public cloud resources by creating an Elastic Compute Cloud Framework out of their on-premises data centers or private clouds, and sending the computations to it.

Another major benefit for organizations is that in some instantiations, they benefit from selling, leasing, trading, or otherwise redistributing in any manner any excess resource capacity to other organizations.

Another major benefit for organizations is that they may leverage the flexibility of the ubiquitous computing created by running any Application (103) in the organization on any Compute Server (100) in the company, without interference. For example, any HPC and/or HTC workflow may run on the unused/idle resources of every Compute Server (100) in the organization.

Another major benefit for organizations is that for organizations that offer server resources to their customers with an infrastructure as a service (IaaS) model, they would have the opportunity to redeploy provisioned but unused/idle resources for any server, independent of whether it has already been provisioned to a customer.

Figure 10:
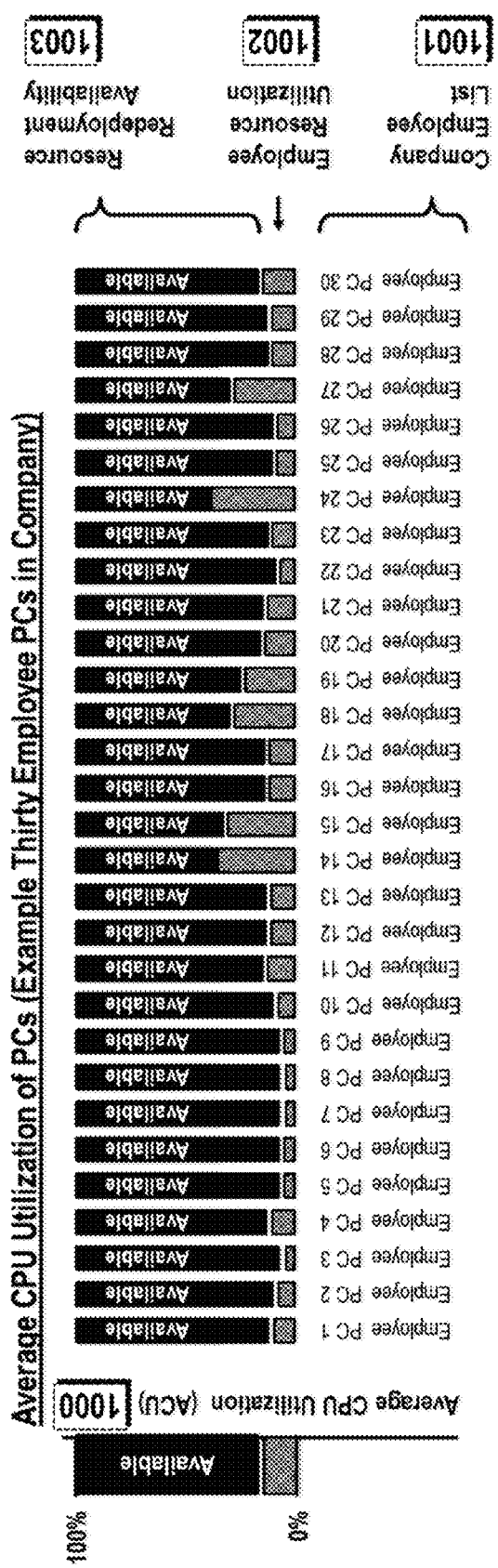
FIG. 10 is an exemplary diagram showing the average CPU utilization (ACU) of exemplary employees for a hybrid and platform-independent virtual private cloud in accordance with some embodiments.

One computing resource that is generally often overlooked is the unutilized (or underutilized) computing power in many of these technologies. For example, most employees inside most enterprise organizations have access to PCs, notebooks, smartphones, tablets, etc. For most of these technologies, the processor utilization, compared to the maximum possible by these devices, is often less than 15%. An example of this is illustrated in FIG. 10, showing the average CPU utilization (ACU) for thirty example employees within an organization. Even though everyone typically wants a powerful computer, on average people are not even close to maximizing its utilization. Therefore, there often exists a potential of more than 85% available processor utilization for each device. When aggregating this computing power across many devices, say across 150,000 PCs in a large enterprise organization, the potential becomes tremendous.

Figure 11:
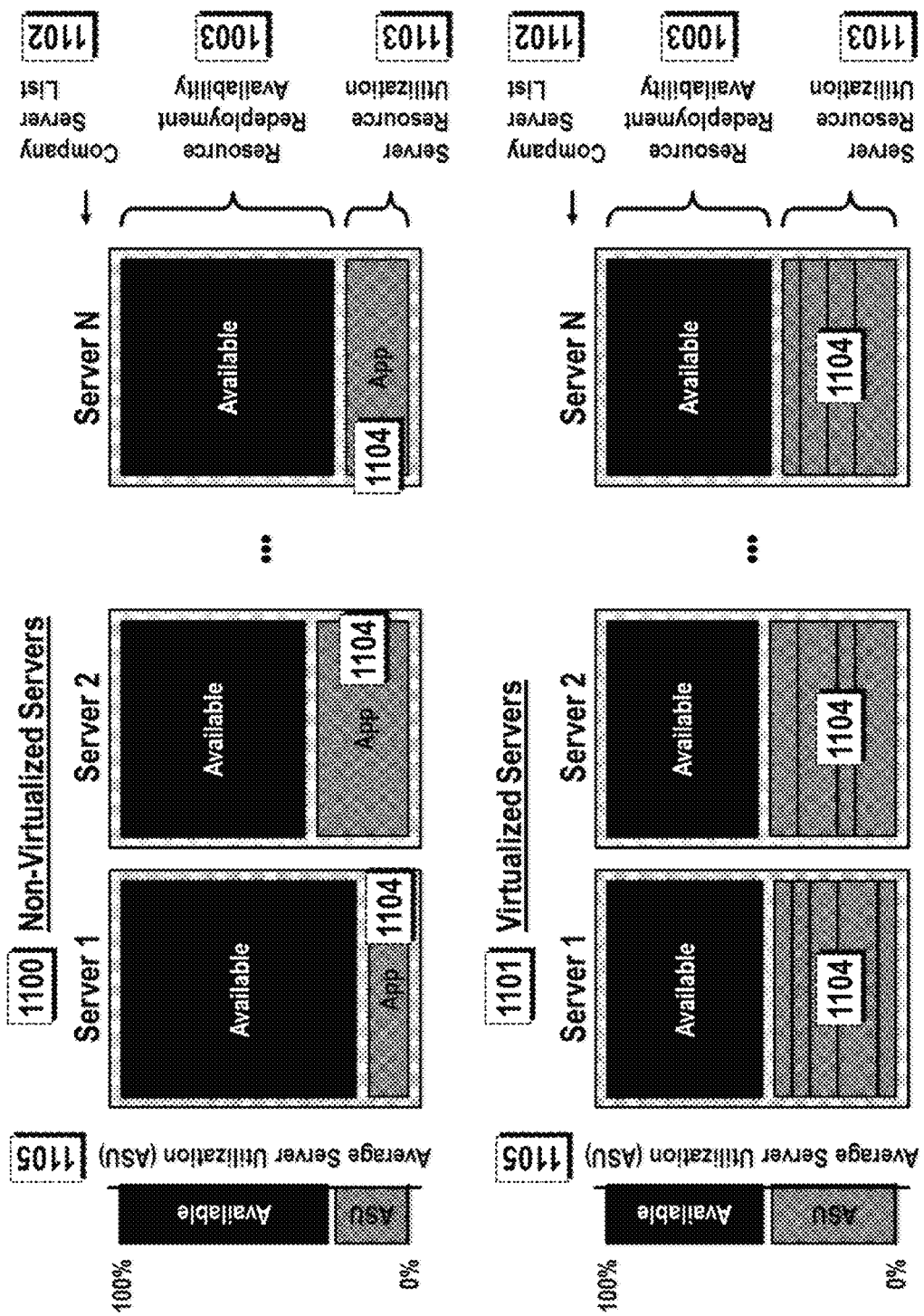
FIG. 11 is an exemplary diagram showing the average server utilization (ASU) for servers within a given organization for a hybrid and platform-independent virtual private cloud in accordance with some embodiments.

Another overlooked computing resource is the unutilized computing power in servers. On average, the utilization of servers without virtualization is less than 20%, creating a potential for the other 80% to be harnessed. Similarly, for servers that leverage virtualization the utilization is, on average, still less than 50%, creating the potential for the other 50% to be harnessed. Examples of this are illustrated in FIG. 11, showing the average server utilization (ASU) for servers (both non-virtualized and virtualized) within a given organization.

Figure 12:
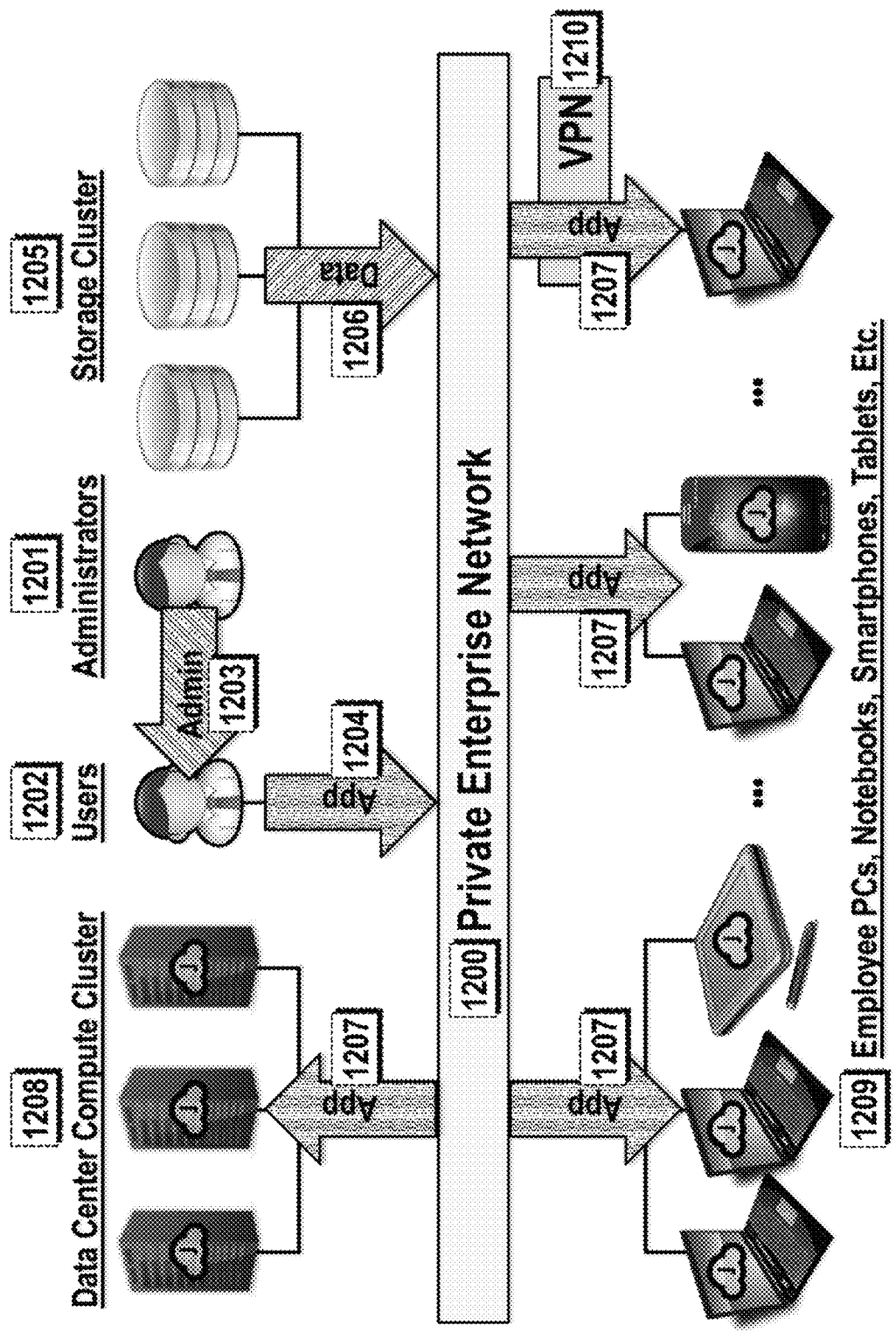
FIG. 12 is an exemplary diagram showing a virtual private cloud (VPC) for a hybrid and platform-independent virtual private cloud in accordance with some embodiments.

By harnessing unutilized computing power in any combination of these and other computing resources, it is possible to form a virtual private cloud (VPC) that can leverage these computer cycles to perform useful tasks. An exemplary architecture of this within an example organization is depicted in FIG. 12. The cloud icons that include a "J" in FIG. 12 represent the VPC formed from underutilized resources within the organization. These resources may be formed from employee PCs, notebooks, smartphones, tablets, etc. and/or servers in the organization, and/or the like. The hybrid approach can leverage computing resources from a variety of devices using a variety of techniques, including distributed containers as described herein, web browsers, and/or the like. Use of web browsers is described in U.S. patent application Ser. No. 14/290,245 filed on May 29, 2014 and Ser. No. 14/312,985, filed on Jun. 24, 2014, the contents of which are hereby incorporated by reference herein in their entirety.

Figure 13:
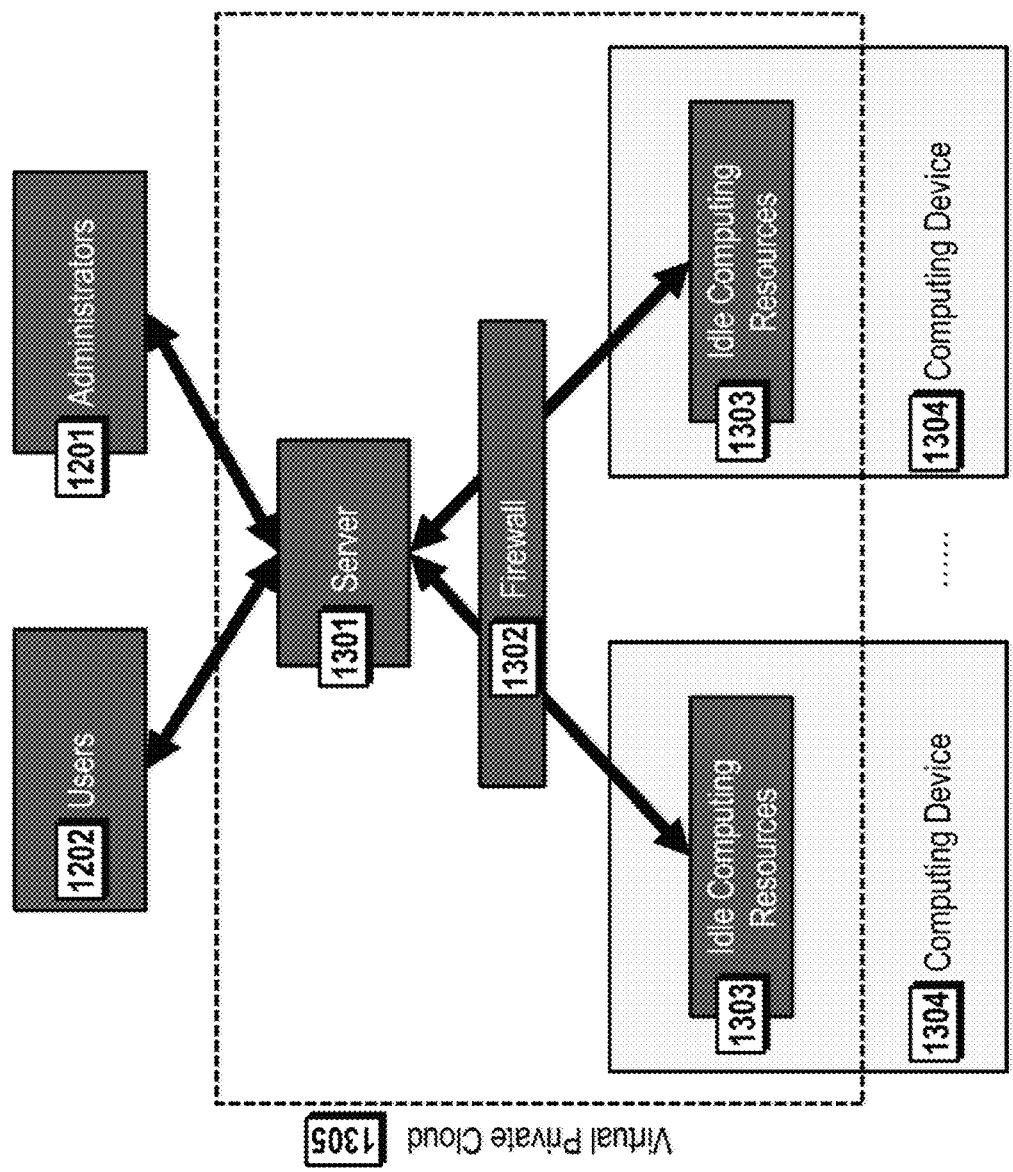
FIG. 13 is an exemplary diagram showing a virtual private cloud (VPC) for a hybrid and platform-independent virtual private cloud in accordance with some embodiments.

FIG. 13 is an exemplary diagram of the communication interaction of the Virtual Private Cloud (1305). Here, the Users (1202) of the system are those that submit computing tasks to be processed in the Virtual Private Cloud (1305). These Users may connect and submit these tasks through the Server (1301), which keeps track of and manages all the available resources of the Virtual Private Cloud (1305). Furthermore, Administrators (1201) of the system may also connect to the Server (1301) to configure settings, manage job queues, and analyze resource availability/utilization. Each Computing Device (1304) also connects to the Server (1301) through a Firewall (1302). The Server (1301) is then able to keep track of the Idle Computing Resources (1303) of the Computing Device (1304), and assign computing tasks to them. The Virtual Private Cloud (1305) is then formed with the Server (1301) and the Idle Computing Resources (1303) available for the computing tasks.

The techniques discussed herein can include one or more of the following exemplary features. One such exemplary feature is to harness the unutilized computing power of systems that are being actively and passively used by people (e.g., including, but not limited to, PCs, notebooks, smartphones, tablets, etc.). For different instantiations of this technology, this includes: (a) Employees, partners, or participants in organizations (e.g., enterprise, government, academic, etc.); (b) Website visitors to designated websites; (c) Participants with designated web browser setups (e.g., modified web browsers, web browser plug-ins, etc.); (d) Participants with designated operating system setups (e.g., installed applications, virtual machines, engines, and frameworks in operating systems, modified operating systems, etc.).

Another such exemplary feature is to harness the computing power of parallel computer nodes such as servers in data centers and high-performance computing systems that can passively or actively connect to the framework. Another such exemplary feature is any combination of the above, in a hybrid fashion.

As stated in number 3, the technologies discussed here can perform the disclosed techniques in a hybrid fashion. This can enable agile computing systems that can completely adapt to the requirements of different types of users of the virtual private cloud.

For example, an organization with many website visitors to a particular domain can leverage the computing resources of the website visitors. If another organization has many employees with work PCs, it can leverage the unutilized computing power of those PCs. Similarly, organizations may also leverage the unutilized computing power of servers. In these examples, the computing resources are already there, and there is no big need for new hardware investment. Such organizations can also choose to simultaneously leverage, or supplement, other existing computing resources to the organization such as cloud computing services, on-premises data centers, etc.

Following this example, each organization can then make decisions about how it uses the computing resources to perform computations. For the ones that have a lot of applications to run, they can run them on the hybrid systems, such as by using intelligent algorithms to dynamically allocate the resources. For the ones that do not have a big computing requirement, but a lot of computing resources, they can allow other organizations to benefit from these resources using any business model of their own choosing.

Figure 7:
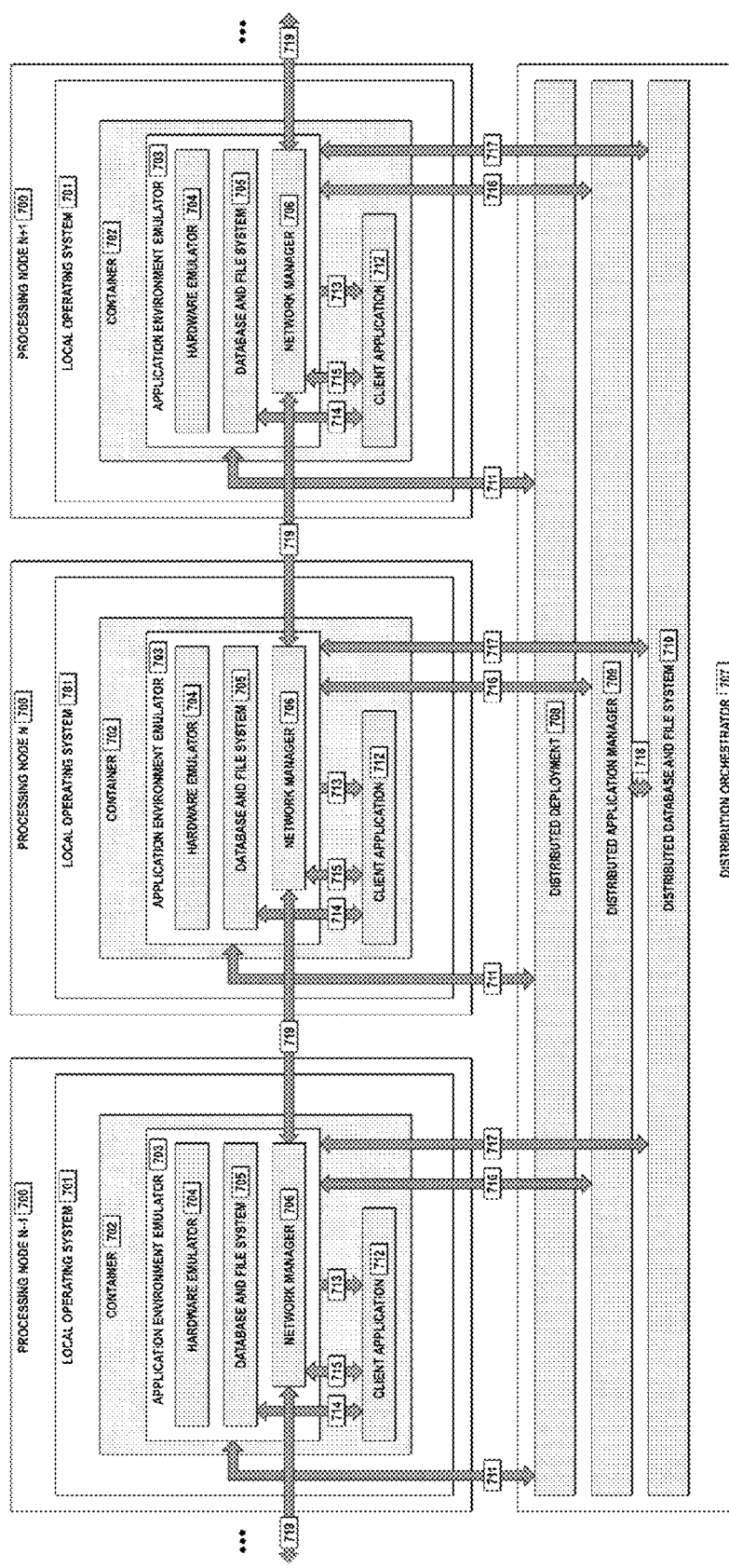
FIG. 7 is an exemplary diagram of a virtual private cloud (VPC) for a hybrid and platform-independent virtual private cloud in accordance with some embodiments.

FIG. 7 is an exemplary diagram of a virtual private cloud (VPC), and includes the Processing Nodes (700) (e.g., Processing Node N−1, Processing Node N, and Processing Node N+1), which are nodes that are capable of performing computations in a parallel computation environment. Example Processing Nodes (700) include, but is not limited to: (a) End users that can (passively or actively) access the framework on a personal computer (PC), notebook, smartphone, tablet, or any other such device that can support a Local Operating System (701). For certain instantiations, these end users may comprise any combination of employees, partners, or participants in organizations (e.g., enterprise, government, academic, etc.), website visitors to designated websites, participants with designated web browser setups (e.g., modified web browsers, web browser plug-ins, etc.), or participants with designated operating system setups (e.g., installed applications, virtual machines, engines, and frameworks in operating systems, modified operating systems, etc.); (b) Parallel computer nodes, such as servers in systems such a data centers and high-performance computing systems, or any other such devices that can support a Local Operating System (701), that can (passively or actively) access the framework.

FIG. 7 also includes Local Operating System (701), which is the operating system local to each Processing Node (700). For certain instantiations, this operating system may be, but is not limited to, Microsoft Windows, OS X, Linux, Android, iOS, Windows Phone, QNX, BSD, or IBM z/OS.

FIG. 7 also includes Container (702), which is the encapsulated local instance of the parallel computing distribution, running on the Local Operating System (701). The Container (702) has all the components inside of it for the corresponding Processing Node (700) to be able to contribute to its computing resources to the virtual private cloud. For certain instantiations, these Containers (702) may be, but are not limited to, Containers (205) (e.g. based on Docker), Language Engines (Container) (800) (see FIG. 8), and Web Browsers (Containers) (900) (see FIG. 9).

FIG. 7 also includes Application Environment Emulator (703), which provides all the hardware and software emulation for applications to run inside the Container (702) to be able to connect and contribute to the virtual private cloud. The Application Environment Emulator (703) may be, but is not limited to, a virtual machine.

FIG. 7 also includes Hardware Emulator (704), which emulates the hardware for applications to run inside the Container (702). This may include, but is not limited to the central processing unit (CPU), graphics processing unit (GPU), programmable interrupt controller (PIC), programmable interval timer (PIT), universal asynchronous receiver/transmitter (UART), real-time clock (RTC), integrated drive electronics (IDE) interface, and hard disk.

FIG. 7 also includes Database and File System (705), which emulate storage capabilities inside the Application Environment Emulator (703). The Database and File System (705) control how, for applications running inside the Container (702), the data is stored and retrieved.

FIG. 7 also includes Network Manager (706), which emulates network capabilities inside the Application Environment Emulator (703). The Network Manager (706) controls how, for applications running inside the Container (702), the data is transmitted and received.

FIG. 7 also includes Distribution Orchestrator (707), which is the back-end deployment of the virtual private cloud. The Distribution Orchestrator (707) includes, but is not limited to, the Distributed Deployment (708), Distributed Application Manager (709), and the Distributed Database and File System (710).

FIG. 7 also includes Distributed Deployment (708), which is the optional back-end seed for the Application Environment Emulator (703) inside the Container (702). This is useful in some instances including, but not limited to: (a) The optional remote access to the Distributed Deployment (708) by the Processing Node (700), which allows the Processing Node (700) to have the latest version of the Application Environment Emulator (703), and any application in the Container (702); (b) When the Application Environment Emulator (703) and the corresponding applications are not preloaded in the Container (702). The Container (702) is then able to be kept lightweight until the Processing Node (700) is ready for the deployment of the virtual private cloud. For certain instantiations, a Framework Loader (801) may be employed in the Container (702) to download or transfer the most appropriate version of the Application Environment Emulator (703) and the corresponding applications from the Distributed Deployment (708).

FIG. 7 also includes Distributed Application Manager (709), which is the back-end coordinator that communicates with and manages the Application Environment Emulator (703) inside the Container (702). The communication may be accomplished through the Database and File System (705), as well as the Network Manager (706).

FIG. 7 also includes Distributed Database and File System (710), which are the back-end storage capabilities that communicate with and manage the Application Environment Emulator (703) inside the Container (702). The communication may be accomplished through the Database and File System (705), as well as the Network Manager (706).

FIG. 7 also includes Client Application (712), which is any application that runs inside the Container (702). FIG. 7 also includes communication links between the building blocks, such as (711), the communication between the Application Environment Emulator (703) and the Distributed Deployment (708).

Another communication link included in FIG. 7 is (716), the communication between the Application Environment Emulator (703) and the Distributed Application Manager (709). Another communication link included in FIG. 7 is (717), the communication between the Distributed Application Manager (709) and the Distributed Database and File System (710). Another communication link included in FIG. 7 is (718), the communication between the Application Environment Emulator (703) and the Distributed Database and File System (710). Another communication link included in FIG. 7 is (719), the communication between Network Managers (706) of two or more Processing Nodes (700). This may be accomplished, for example, using standard peer-to-peer (P2P) techniques.

Figure 8:
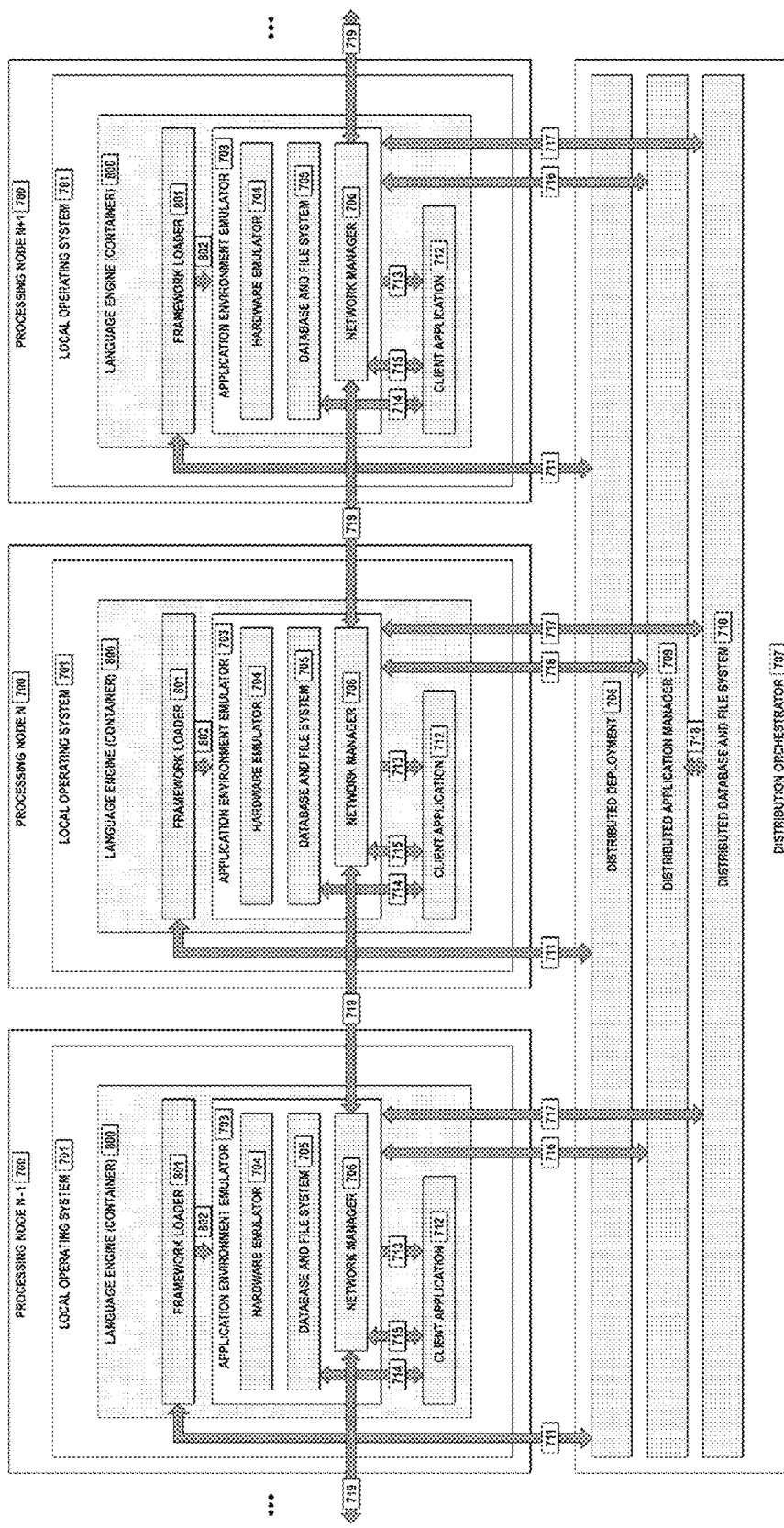
FIG. 8 is an exemplary diagram of a virtual private cloud (VPC) with a language engine container for a hybrid and platform-independent virtual private cloud in accordance with some embodiments.

FIG. 8 is an exemplary diagram of a virtual private cloud (VPC) with a language engine container, which includes Language Engine (Container) (800), which is the encapsulated local instance of the parallel computing distribution through a specific language engine, running on the Local Operating System (701). The Language Engine (Container) (800) has all the components inside of it for the corresponding Processing Node (700) to be able to contribute to its computing resources to the virtual private cloud.

FIG. 8 also includes Framework Loader (801), which may be employed to download or transfer the most appropriate version of the Application Environment Emulator (703) and the corresponding applications from the Distributed Deployment (708).

The communication link in FIG. 8 between the building blocks is (802), the communication between the Framework Loader (801) and the Application Environment Emulator (703). Once the Framework Loader (801) is called to obtain the most appropriate version of the Application Environment Emulator (703) and the corresponding applications from the Distributed Deployment (708), it then runs the Application Environment Emulator (703) and the corresponding applications.

Figure 9:
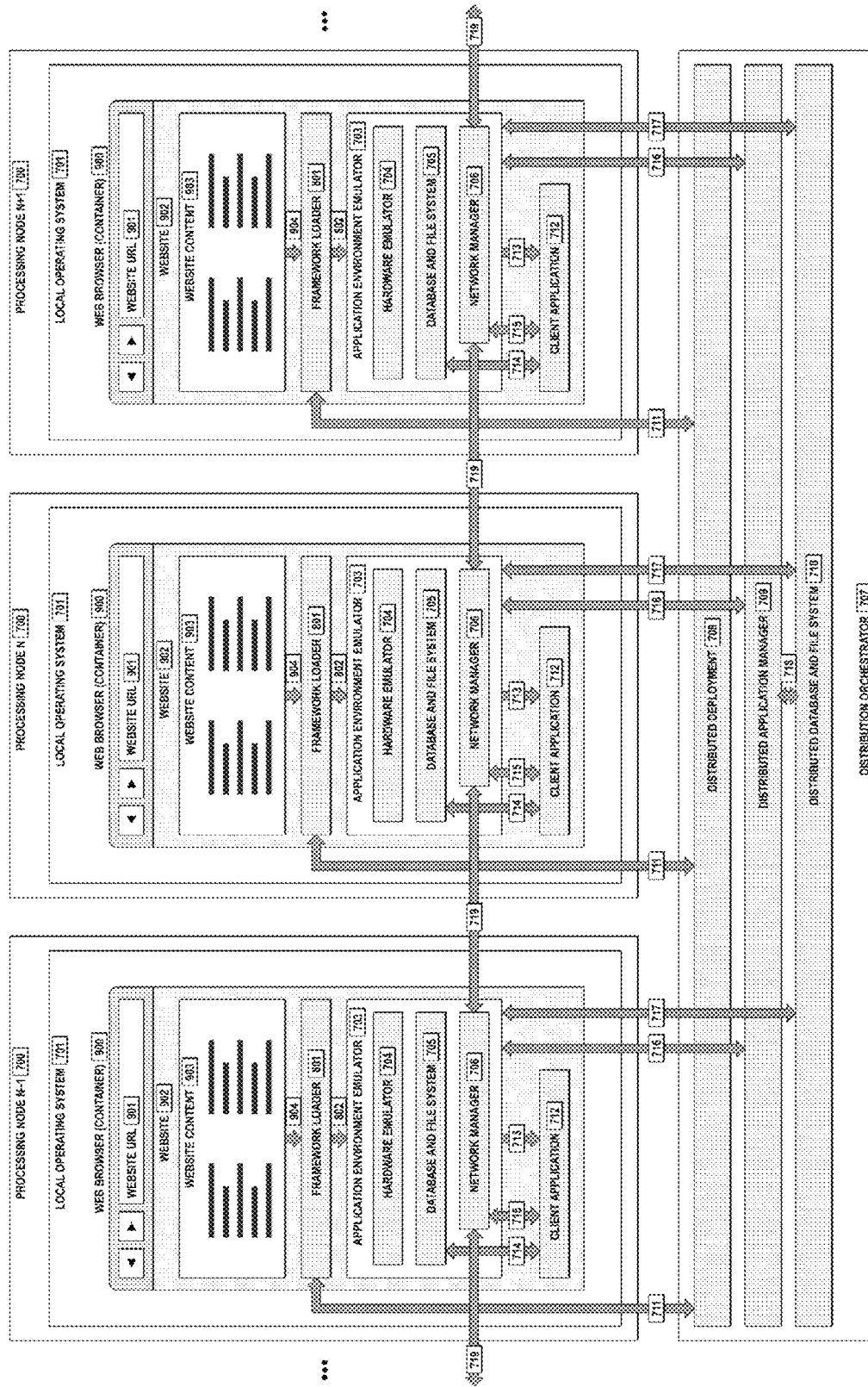
FIG. 9 is an exemplary diagram of a virtual private cloud (VPC) with a web browser container for a hybrid and platform-independent virtual private cloud in accordance with some embodiments.

FIG. 9 is an exemplary diagram of a virtual private cloud (VPC) with a web browser container, which includes Web Browser (Container) (900), which in some instantiations gives Processing Nodes (700) access to the virtual private cloud. This Web Browser (Container) (900) may be, but is not limited to, Google Chrome, Mozilla Firefox, Internet Explorer, Opera, and Safari.

FIG. 9 also includes Website URL (901), a character string that constitutes a reference to the Website (902) resources, accessed through the Web Browser (Container) (900). FIG. 9 also includes Website (902), resources available through the Web Browser (Container) (900).

FIG. 9 also includes Website Content (903), which includes all the content on the Website (902). This content may comprise anything from text and/or HTML content to image, audio, video, document, data, and/or application content. The Website Content (903) may also include the Framework Loader (801). This content may also be intentionally left blank, except for the Framework Loader (801).

The communication link in FIG. 9 between the building blocks is (904), the loading of the Framework Loader (801) as part of the Website Content (903). The Website Content (902) is loaded as part of the Website (902), and along with it loads the Framework Loader (801). The Framework Loader (801) then obtains the most appropriate version of the Application Environment Emulator (703) and the corresponding applications from the Distributed Deployment (708), and then runs the Application Environment Emulator (703) and the corresponding applications.

FIG. 10 is an exemplary diagram depicting average resource (e.g. PC CPU) utilization for example thirty employees in a company. This figure includes Average CPU Utilization (ACU) (1000), which consists of two components: Employee Resource Utilization (1002), the amount of resources the employee uses (e.g. average CPU utilization of the employee PC), and Resource Redeployment Availability (1003), the amount of resources available that are otherwise not being utilized. These two amounts are constantly dynamically changing for each employee in the company.

FIG. 10 also includes Company Employee List (1001), which lists out the employees in the company that have access to resources (e.g. PCs, notebooks, smartphones, tablets, etc.).

FIG. 11 is an exemplary diagram depicting average server utilization for example servers in a company. This figure includes Average Server Utilization (ASU) (1105), which consists of two components: Server Resource Utilization (1003), the amount of resources the server uses (e.g. average CPU utilization of the applications, or Apps (1104) running on the server), and Resource Redeployment Availability (1003), the amount of resources available that are otherwise not being utilized. These two amounts are constantly dynamically changing for each server in the company.

FIG. 11 also includes Company Server List (1102), which lists out the servers in the company. FIG. 11 also includes the depiction of two typical types of servers deployed by the company: Non-Virtualized Servers (1100) (also referred to as physical servers) and Virtualized Servers (1101) (e.g. those that leverage a hypervisor).

FIG. 12 is an exemplary diagram depicting an example company resource structure. This figure includes Private Enterprise Network (1200), which is the network supporting the computing, storage, and employee device resources.

FIG. 12 also includes Administrators (1201) of the system, which may perform functionalities such as configure settings, manage job queues, and analyze resource availability/utilization through an Admin (1203) interface. FIG. 12 also includes Users (1202), who actually deploy the Apps (1207) (i.e. applications) to the compute resources. These compute resources include the Data Center Compute Cluster (1208), and Employee PCs, Notebooks, Smartphone, Tablets, Etc. (1209), some of which may be connected via a VPN (1210) (virtual private network).

As shown in FIG. 12, some of the Apps (1207) may utilize dedicated Storage Clusters (1205), which will send and receive Data (1206).

FIG. 12 shows a company computing and storage architecture. The Private Enterprise Network 1200 is the physical network that connects the employee Devices 1209 with the other devices (e.g., 1208, 1202, etc.). The techniques described herein can be implemented by configuring the settings of the virtual private cloud (e.g., by the Administrators 1201) to configure the system to monitor for activities and set up the system for users. Users of the virtual private cloud can be, for example, people in the company that launch applications. The user applications can then run completely agnostic to the platforms in the network—the applications can run on data centers (e.g., Data Center 1208), servers, employee PCs, and/or any available hardware in the network.

Advantageously, user's don't need to care where applications run—the system can automatically figure out where to deploy applications to use available compute resources. For example, if servers are under capacity then user applications would be routed to execute on those servers. As another example, if the servers are at high capacity then the apps will get routed to other less-utilized resources. Instead of just utilizing just a single technique to access available resources, such as a web browser inside of a PC (e.g., such as shown with FIG. 9 with a Browser 900 executing inside the Local Operating System 701 in a Processing Node 700), the techniques can execute a hybrid approach that leverages any processing node using a generic container (e.g., Container 702 shown in FIG. 7) that allows applications to run in idol capacity on the associated device. For example, the hybrid approach can use a JavaScript application that runs as a JavaScript application in a browser, a container (e.g., a container implemented using Docker, which executes a container engine to help sweep up capacity of a data center cluster), and/or the like. This allows spare capacity from not only desktops that executed browsers to be utilized, but also other compute resources such as servers, smartphones, and/or the like.

Example Implementations

An example implementation of FIG. 7 could be via a container engine, Container (702) such as Containers (205) (e.g. based on Docker). It can be installed directly on the Local Operating System (701) of the Processing Node (700) and it manages the resources to run many simultaneous applications while minimizing the overhead of virtual machines. Alternatively, a hypervisor could be used to run each application in its own virtual machine.

An example implementation of FIG. 8 could be via an installation of a JavaScript (or other language) engine (e.g. V8, TraceMonkey, Nitro), Language Engine (Container) (800), within the Local Operating System (701) of the Processing Node (700), and executing code written in that language. It is possible to translate various applications from one language to another (especially to JavaScript), so this does not necessarily limit the applications by the language they are written in.

An implementation of FIG. 9 may involve the browser, Web Browser (Container) (900), that is already installed on the Local Operating System (701) of the Processing Node (700), or a custom browser that can be installed. Similarly to the JavaScript engine in FIG. 8, the browser can support JavaScript (and other) payloads as website content, process them, and return the results. This makes it a very functional container for computation applications.

Dynamic Allocation Algorithms

In some exemplary environments where the proposed system may be installed to harvest idle computer cycles, the system can be configured to minimize the impact on higher priority applications running on the same hardware. This may be used to ensure, for example, that the system only harvests the idle resources, such as compute and/or network, does not interfere with other computation, and/or the like. Several exemplary algorithms are proposed to address application priority.

In some embodiments, an exemplary algorithm is the real-time resource (e.g. CPU) yield and grab component that allows lower-priority processes, such as Secondary Applications (206), to utilize spare resources (e.g. CPU cycles) without interfering with the resource requirements of higher-priority processes, such as Incumbent Applications (202). One example instantiation of this concept consists of several operational stages: (a) Kernel Stage: in this stage, the system sets Secondary Applications (206) to the lowest possible priority (e.g. idle priority), and passively monitors the running processes. When Incumbent Applications (202) start, the kernel dedicates the required resources to their normal/high priority processes. Furthermore, a threshold-based algorithm can then detect a resource demand spike of a particular process and initiate the next stage of the algorithm: the User Stage; (b) User Stage: in this stage, the system actively pauses the process or container to allow the Incumbent Application (206) to use all the resources it requires. This may be done via, but is not limited to, a command such as "kill—STOP", or via a container pause request. The Secondary Applications (206) can then be resumed once the Incumbent Applications (202) are finished using the resources, or their state can be transferred to a different Compute Server (100) to finish.

Another such proposed exemplary algorithms are CPU back-off algorithms. The algorithms minimize the impact on the system and allow the operating system to control the time slices of the different processes via process priority. If this functionality is unavailable or not preferable, for example, a timer process may run periodically with an algorithm of known execution time. If the execution time is measured to be longer than expected, it can be inferred that the system is overloaded and the processing needs to be paused or minimized.

Another such proposed exemplary algorithms are network back-off algorithms. Many CPU intensive applications also have steep needs for network throughput. In order to minimize the impact on higher-priority applications, the system can monitor round-trip communication times (RTT) on a relevant path between two nodes on the network. If the RTT starts going up, the network is getting congested and the system should reduce its use of the network. A path can be determined to be relevant if it connects two nodes via network hardware that carries data for other applications on the network. A network throttling shim can be implemented to artificially throttle the bandwidth for any specific application.

Automatic Injection Method for Web Browsers

In certain networks, it may be possible to inject processing code that would be capable of running in a web browser directly through the local networking hardware. When a web browser on a computer device (including, but not limited to, PCs, notebooks, smartphones, tablets, etc.) connected to the local area network (LAN) is used to access an internal or external webpage, the networking hardware can add a script to the webpage header, body, or footer, which will cause the loaded webpage to run the processing code and enable the virtual private cloud to harness the idle compute cycles of the compute device.

Ubiquitous Interface

It is possible to add a shim to the existing system to enable it to function within and/or in parallel existing schedule frameworks. This shim could be configured to provide the schedule with the information it needs to make decisions on whether the proposed low-priority processing system would be appropriate for the task being deployed. Such decision-making functionality can also be added to the system itself, allowing it to make the decision to take the task on or to delegate it to other computing systems such as cloud computing services, on-premises data centers, etc.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A computing system for leveraging available computing resources from a plurality of computing devices using containers, wherein each computing device from the plurality of computing devices executes a container that virtualizes a portion of an operating system executing on the computing device such that the container can execute one or more secondary applications in isolation from any incumbent applications being executed by the operating system on the computing device that have priority over the one or more secondary applications, the computing system comprising:
   a memory and a processor in communication with the memory configured to execute instructions stored on the memory that cause the processor to:
      receive data from each of a plurality of computing devices in communication with the computing system, wherein:
         each computing device from the plurality of computing devices is executing a container that virtualizes a portion of an operating system executing on the computing device such that the container can execute one or more secondary applications in isolation from any incumbent applications being executed by the operating system on the computing device; and
         the data comprises data indicative of resource metrics for an operating system, a container, or both, for each of the plurality of computing devices;
      determine available computing resources on one or more of the plurality of computing devices based on the data, such that the available computing resources will not interfere with execution of incumbent applications on each of the one or more computing devices;
      schedule a secondary application for execution by a container on each of the one or more computing devices with available computing resources so that available computing resources on the one or more computing devices can be leveraged to execute the secondary application; and
      elastically modify computing resource usage of one or more secondary applications executing in a container on one of the computing devices by:
         identifying an increase in computing resource usage by one or more incumbent applications executing on the computing device;
         determining, based on the data and the identified increase, that the incumbent applications executing on the computing device require more computing resources than are currently available on the computing device;
         causing the container on the computing device to instantaneously yield an amount of computing resources being used by the secondary applications executing in the container on the computing device to allow the incumbent applications executing on the computing device to utilize at least a portion of the yielded computing resources;
         identifying a decrease in computing resource usage by the incumbent applications executing on the computing device;
         determining, based on the data and the decrease, that computing resources are available on the computing device for execution of the secondary applications in the container on the computing device; and
         causing the container on the computing device to instantaneously obtain at least a portion of the available computing resources on the computing device to allow the secondary applications in the container on the computing device to execute using at least the portion of the available computing resources on the computing device.

2. The computing system of claim 1, wherein, for each computing device from the plurality of computing devices, the resource metrics comprise resource metrics for:
   an operating system of the computing device executing one or more incumbent applications and hardware resources associated with the operating system; and
   a container executing a virtual space on the computing device to execute one or more secondary applications and hardware resources associated with the container.

3. The computing system of claim 1, wherein the instructions are operable to cause the processor to:
   receive data indicative of an increase in resource usage by one or more incumbent applications being executed on a computing device that the computing system scheduled to execute the secondary application; and
   schedule the secondary application to execute on a different computing device with available computing resources to avoid affecting execution of the one or more incumbent applications being executed on the computing device.

4. A computing system configured to leverage available computing resources on the computing system by executing a container that virtualizes a portion of an operating system executing on the computing system such that the container can execute one or more secondary applications in isolation from any incumbent applications being executed by the operating system that have priority over the one or more secondary applications, the computing system comprising:
   a memory and a processor in communication with the memory configured to execute instructions stored on the memory that cause the processor to:
      transmit data to an application management engine in communication with the computing system and a set of computing devices, wherein the data is indicative of resource metrics for:
         an operating system executing on the computing device;
         a container executing on the computing system that virtualizes a portion of the operating system such that the container can execute one or more secondary applications in isolation from any incumbent applications being executed by the operating system that have priority over the one or more secondary applications; or both;

receive, from the application management engine, a secondary application to execute using the container;

execute the secondary application using the container so that available computing resources of the computing system can be leveraged to execute the secondary application; and elastically modify computing resource usage of one or more secondary applications executing in a container on one of the computing devices by:

identifying an increase in computing resource usage by one or more incumbent applications executing on the computing device;

determining, based on the data and the identified increase, that the incumbent applications executing on the computing device require more computing resources than are currently available on the computing device;

causing the container on the computing device to instantaneously yield an amount of computing resources being used by the secondary applications executing in the container on the computing device to allow the incumbent applications executing on the computing device to utilize at least a portion of the yielded computing resources;

identifying a decrease in computing resource usage by the incumbent applications executing on the computing device;

determining, based on the data and the decrease, that computing resources are available on the computing device for execution of the secondary applications in the container on the computing device; and causing the container on the computing device to instantaneously obtain at least a portion of the available computing resources on the computing device to allow the secondary applications in the container on the computing device to execute using at least the portion of the available computing resources on the computing device.

5. The computing system of claim 4, wherein the instructions cause the processor to determine the resource metrics for the computing system, comprising:

determining resource metrics for the operating system and hardware associated with the operating system using a resource monitor executing external from the container configured to monitor resource metrics for the operating system and the hardware.

6. The computing system of claim 5, wherein the instructions cause the processor to determine the resource metrics for the computing system, comprising:

determining resource metrics for the container and hardware associated with the container using a resource monitor being executed in the container.

7. The computing system of claim 4, wherein the instructions cause the processor to:

determine an increase in resource utilization by an incumbent application; and transmit data to the application management engine indicative of the increase in resource utilization by the incumbent application.

8. The computing system of claim 4, wherein the instructions cause the processor to:

receive data from the application management engine indicative of a command to terminate execution of the secondary application being executed in the container; and terminate execution of the secondary application.

9. A computerized method for leveraging available computing resources from a plurality of computing devices using containers, wherein each computing device from the plurality of computing devices executes a container that virtualizes a portion of an operating system executing on the computing device such that the container can execute one or more secondary applications in isolation from any incumbent applications being executed by the operating system on the computing device that have priority over the one or more secondary applications, the computerized method comprising:

receiving, by a computing system comprising a processor and a memory, data from each of a plurality of computing devices in communication with the computing system, wherein:

each computing device from the plurality of computing devices is executing a container that virtualizes a portion of an operating system executing on the computing device such that the container can execute one or more secondary applications in isolation from any incumbent applications being executed by the operating system on the computing device; and the data comprises data indicative of resource metrics for an operating system, a container, or both, for each of the plurality of computing devices;

determining, by the computing system, available computing resources on one or more of the plurality of computing devices based on the data, such that the available computing resources will not interfere with execution of incumbent applications on each of the one or more computing devices;

scheduling, by the computing system, a secondary application for execution by a container on each of the one or more computing devices with available computing resources so that available computing resources on the one or more computing devices can be leveraged to execute the secondary application; and elastically modifying, by the computing system, computing resource usage of one or more secondary applications executing in a container on one of the computing devices by:

identifying an increase in computing resource usage by one or more incumbent applications executing on the computing device;

determining, based on the data and the identified increase, that the incumbent applications executing on the computing device require more computing resources than are currently available on the computing device;

causing the container on the computing device to instantaneously yield an amount of computing resources being used by the secondary applications executing in the container on the computing device to allow the incumbent applications executing on the computing device to utilize at least a portion of the yielded computing resources;

identifying a decrease in computing resource usage by the incumbent applications executing on the computing device;

determining, based on the data and the decrease, that computing resources are available on the computing device for execution of the secondary applications in the container on the computing device; and causing the container on the computing device to instantaneously obtain at least a portion of the available computing resources on the computing device to allow the secondary applications in the container on the computing device to execute using at least the portion of the available computing resources on the computing device.

10. The method of claim 9, wherein, for each computing device from the plurality of computing devices, the resource metrics comprise resource metrics for:

an operating system of the computing device executing one or more incumbent applications and hardware resources associated with the operating system; and a container executing a virtual space on the computing device to execute one or more secondary applications and hardware resources associated with the container.

11. The method of claim 9, further comprising:

receiving data indicative of an increase in resource usage by one or more incumbent applications being executed on a computing device that the computing system scheduled to execute the secondary application; and scheduling the secondary application to execute on a different computing device with available computing resources to avoid affecting execution of the one or more incumbent applications being executed on the computing device.

12. A computerized method for leveraging available computing resources on the computing system by executing a container that virtualizes a portion of an operating system executing on the computing system such that the container can execute one or more secondary applications in isolation from any incumbent applications being executed by the operating system that have priority over the one or more secondary applications, the computerized method comprising:

transmitting, by the computing system, data to an application management engine in communication with the computing system and a set of computing devices, wherein the data is indicative of resource metrics for:

an operating system executing on the computing device;

a container executing on the computing system that virtualizes a portion of the operating system such that the container can execute one or more secondary applications in isolation from any incumbent applications being executed by the operating system that have priority over the one or more secondary applications; or both;

receiving, by the computing system, from the application management engine, a secondary application to execute using the container;

executing, by the computing system, the secondary application using the container so that available computing resources of the computing system can be leveraged to execute the secondary application; and elastically modifying, by the computing system, computing resource usage of one or more secondary applications executing in a container on one of the computing devices by:

identifying an increase in computing resource usage by one or more incumbent applications executing on the computing device;

determining, based on the data and the identified increase, that the incumbent applications executing on the computing device require more computing resources than are currently available on the computing device;

causing the container on the computing device to instantaneously yield an amount of computing resources being used by the secondary applications executing in the container on the computing device to allow the incumbent applications executing on the computing device to utilize at least a portion of the yielded computing resources;

identifying a decrease in computing resource usage by the incumbent applications executing on the computing device;

determining, based on the data and the decrease, that computing resources are available on the computing device for execution of the secondary applications in the container on the computing device; and causing the container on the computing device to instantaneously obtain at least a portion of the available computing resources on the computing device to allow the secondary applications in the container on the computing device to execute using at least the portion of the available computing resources on the computing device.

13. The method of claim 12, further comprising determining resource metrics for the operating system and hardware associated with the operating system using a resource monitor executing external from the container configured to monitor resource metrics for the operating system and the hardware.

14. The method of claim 13, further comprising determining resource metrics for the container and hardware associated with the container using a resource monitor being executed in the container.

15. The method of claim 12, further comprising:

determining an increase in resource utilization by an incumbent application; and transmitting data to the application management engine indicative of the increase in resource utilization by the incumbent application.

16. The method of claim 12, further comprising:

receiving data from the application management engine indicative of a command to terminate execution of the secondary application being executed in the container; and terminating execution of the secondary application.

* * * * *